US012736860B2

(12) United States Patent
Hsu

(10) Patent No.: US 12,736,860 B2
(45) Date of Patent: Sep. 15, 2026

(54) REFLECTIVE DIFFUSION DEVICE AND PROJECTION DEVICE

(71) Applicant: Coretronic Corporation, Hsin-Chu (TW)

(72) Inventor: Pi-Tsung Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 288 days.

(21) Appl. No.: 18/358,036

(22) Filed: Jul. 25, 2023

(65) Prior Publication Data

US 2024/0077793 A1 Mar. 7, 2024

(30) Foreign Application Priority Data

Sep. 2, 2022 (CN) ........................ 202211069336.4

(51) Int. Cl.
*G03B 21/14* (2006.01)
*G02B 5/02* (2006.01)
*G03B 21/20* (2006.01)

(52) U.S. Cl.
CPC ......... *G03B 21/142* (2013.01); *G02B 5/0284* (2013.01); *G03B 21/204* (2013.01); *G03B 21/2066* (2013.01)

(58) Field of Classification Search
CPC ................ G03B 21/142; G03B 21/204; G03B 21/2066; G02B 5/0284
See application file for complete search history.

(56) References Cited

U.S. PATENT DOCUMENTS

| | | | |
|---|---|---|---|
| 5,257,051 | A | 10/1993 | Bushroe |
| 10,670,954 | B2 | 6/2020 | Hsu et al. |
| 2011/0058381 | A1 | 3/2011 | Chiang et al. |

(Continued)

FOREIGN PATENT DOCUMENTS

| | | |
|---|---|---|
| CN | 1653361 | 8/2005 |
| CN | 102692800 | 9/2012 |

(Continued)

OTHER PUBLICATIONS

"Office Action of China Counterpart Application", issued on Mar. 23, 2026, pp. 1-20.

(Continued)

*Primary Examiner* — Magda Cruz
(74) *Attorney, Agent, or Firm* — JCIPRNET

(57) ABSTRACT

A reflective diffusion device including a reflecting member and a diffusing member is provided, which are adapted for reflecting and diffusing an excitation light beam emitted from a light source module. The reflecting member has a central axis and includes a reflective surface facing the light source module. The diffusing member is disposed on a portion of the reflective surface of the reflecting member. The excitation light beam is incident on a first position of the reflective diffusion device in an incident direction parallel to the central axis, is reflected by the reflective surface and transmitted to a second position of the reflective diffusion device, and is then reflected by the reflective surface to maintain the excitation light beam or form a diffused light beam. The excitation light beam or the diffused light beam exits from the reflective diffusion device in an exit direction parallel to the central axis.

20 Claims, 27 Drawing Sheets

(56) References Cited

U.S. PATENT DOCUMENTS

| | | | |
|---|---|---|---|
| 2012/0327380 | A1 | 12/2012 | Iwabayashi |
| 2015/0062903 | A1 | 3/2015 | Hu et al. |
| 2016/0026076 | A1 | 1/2016 | Hu |
| 2016/0291315 | A1 | 10/2016 | Hsu |
| 2016/0349606 | A1* | 12/2016 | Nishimori ............ G03B 21/208 |
| 2020/0174355 | A1 | 6/2020 | Liu |
| 2020/0225462 | A1 | 7/2020 | Hsu et al. |
| 2021/0148544 | A1 | 5/2021 | Chen |
| 2021/0364901 | A1 | 11/2021 | Liao |
| 2023/0111590 | A1* | 4/2023 | Chen ........................ G02B 5/09 359/630 |
| 2023/0244131 | A1 | 8/2023 | Hirahara |

FOREIGN PATENT DOCUMENTS

| | | | |
|---|---|---|---|
| CN | 203082725 | 7/2013 | |
| CN | 103343922 | 10/2013 | |
| CN | 103616770 | 3/2014 | |
| CN | 103631080 | 3/2014 | |
| CN | 103777445 | 5/2014 | |
| CN | 104595757 | 5/2015 | |
| CN | 104880899 | 9/2015 | |
| CN | 105005418 | 10/2015 | |
| CN | 105892200 | 8/2016 | |
| CN | 106062628 | 10/2016 | |
| CN | 102959320 | 3/2017 | |
| CN | 106483746 | 3/2017 | |
| CN | 106641887 | 5/2017 | |
| CN | 106662305 | 5/2017 | |
| CN | 106773482 | 5/2017 | |
| CN | 106886124 | 6/2017 | |
| CN | 107272315 | 10/2017 | |
| CN | 206647789 | 11/2017 | |
| CN | 107885020 | 4/2018 | |
| CN | 208537894 | 2/2019 | |
| CN | 109683443 | 4/2019 | |
| CN | 110618575 | 12/2019 | |
| CN | 110967902 | 4/2020 | |
| CN | 211014994 | 7/2020 | |
| CN | 112925097 | 6/2021 | |
| CN | 214252860 | 9/2021 | |
| JP | H06111614 | 4/1994 | |
| JP | H11176220 | 7/1999 | |
| JP | 2003207325 | 7/2003 | |
| JP | 2006208053 | 8/2006 | |
| JP | 2007234407 | 9/2007 | |
| JP | 2011077056 | 4/2011 | |
| JP | 2015184407 | 10/2015 | |
| JP | 2016136461 A * | 7/2016 | ............ G03B 21/14 |
| JP | 2021077588 | 5/2021 | |
| JP | 2021092728 | 6/2021 | |
| KR | 20140055220 | 5/2014 | |
| WO | WO-2020135300 A1 * | 7/2020 | ........... G03B 21/208 |
| WO | 2021260877 | 12/2021 | |

OTHER PUBLICATIONS

Office Action of related U.S. Appl. No. 18/449,717, issued on Oct. 22, 2025, p. 1-p. 14.

"Office Action of China Counterpart Application", issued on Mar. 23, 2026, p. 1-p. 14.

* cited by examiner

REFLECTIVE DIFFUSION DEVICE AND PROJECTION DEVICE

CROSS-REFERENCE TO RELATED APPLICATION

This application claims the priority benefit of China application serial no. 202211069336.4, filed on Sep. 2, 2022. The entirety of the above-mentioned patent application is hereby incorporated by reference herein and made a part of this specification.

BACKGROUND

Technical Field

The disclosure relates to a light beam diffusion device and a projection device, and in particular relates to a reflective diffusion device and a projection device.

Description of Related Art

A projection imaging system (such as a projector) using a laser as a light source often has a speckle problem that affects the imaging quality. In order to eliminate the problem of excitation light speckle, the general projection system adopts a static diffusion sheet or a high-speed rotating diffusion wheel. When the excitation light is transmitted through the diffusion sheet or the diffusion wheel, its energy density is reduced, thereby generating scattered excitation light to eliminating the concentrated speckle. However, the incident excitation light and the exiting excitation light of such a projection system are respectively located on two sides of the diffusion sheet or the diffusion wheel, resulting in a limited beam path layout, which is not conducive to space utilization.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides a reflective diffusion device, which facilitates space utilization.

The other objectives and advantages of the invention may be further understood from the descriptive features disclosed in the invention.

In order to achieve one of, or portions of, or all of the above objectives or other objectives, an embodiment of the invention provides a reflective diffusion device adapted for reflecting and diffusing an excitation light beam emitted from a light source module, including a reflecting member and a diffusing member. The reflecting member has a central axis and includes a reflective surface facing a light source module. An included angle greater than 0 degrees and less than 90 degrees is between the reflective surface and the central axis. The diffusing member is disposed on at least a portion of the reflective surface of the reflecting member. The excitation light beam is incident on a first position of the reflective diffusion device in an incident direction parallel to the central axis, is reflected by the reflective surface of the reflecting member and transmitted to a second position of the reflective diffusion device, and is then reflected by the reflective surface to maintain the excitation light beam or form a diffused light beam. The excitation light beam or the diffused light beam exits from the reflective diffusion device in an exit direction parallel to the central axis, and the first position and the second position are symmetrical to the central axis.

An embodiment of the invention also provides a projection device including a lighting module, a light valve, and a projection lens. The lighting module is configured to provide a lighting beam, and includes a light source module, a reflective diffusion device and a wavelength conversion device. The light source module is used to emit an excitation light beam. The reflective diffusion device includes a reflecting member and a diffusing member. The reflecting member has a central axis and includes a reflective surface facing the light source module. An included angle greater than 0 degrees and less than 90 degrees is between the reflective surface and the central axis. The diffusing member is disposed on at least a portion of the reflective surface of the reflecting member. The excitation light beam is incident on a first position of the reflective diffusion device in an incident direction parallel to the central axis, is reflected by the reflective surface of the reflecting member and transmitted to a second position of the reflective diffusion device, and is then reflected by the reflective surface to maintain the excitation light beam or form a diffused light beam. The excitation light beam or the diffused light beam exits from the reflective diffusion device in an exit direction parallel to the central axis. The wavelength conversion device is disposed on a path of the excitation light beam or the diffused light beam from the reflective diffusion device to convert the excitation light beam or the diffused light beam into a converted light beam. The converted light beam transmitted out of the lighting module serves as the lighting beam provided by the lighting module, and the first position and the second position are symmetrical to the central axis. The light valve is disposed on a path of the lighting beam to convert the lighting beam into an image beam. The projection lens is disposed on a path of the image beam and is used to project the image beam out of the projection device.

Based on the above, the reflective diffusion device of the invention includes a reflecting member and a diffusing member, which are adapted for reflecting and diffusing the excitation light beam emitted by the light source module. Through the reflecting member and the diffusion device, the incident excitation light beam and the exiting diffused light beam are located on the same side of the reflective diffusion device, which facilitates space utilization and improves the flexibility of light path design. In addition, the excitation light beam passes through the diffusing member at least twice, which may achieve better beam diffusing effect.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWING

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
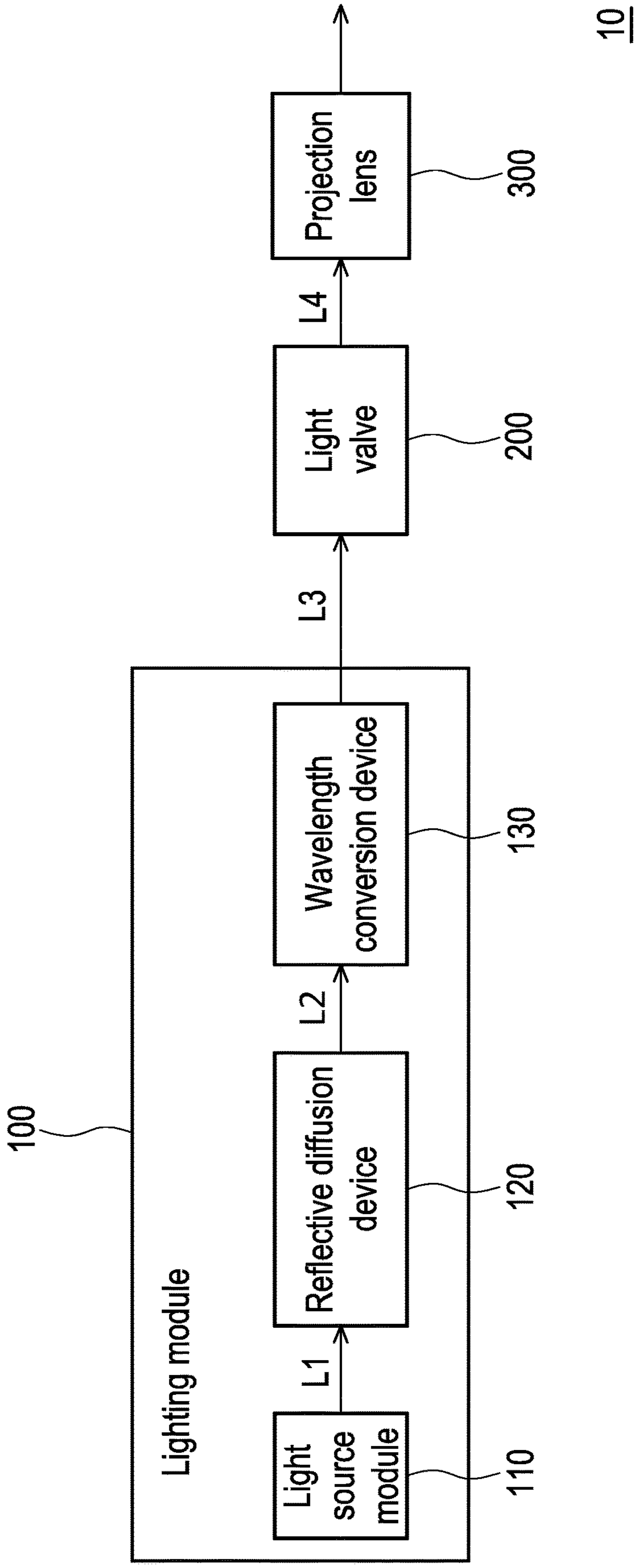
FIG. 1 is a schematic diagram of a projection device according to an embodiment of the invention.

FIG. 1 is a schematic diagram of a projection device according to an embodiment of the invention. Referring to FIG. 1, the projection device 10 includes a lighting module 100, a light valve 200, and a projection lens 300. The projection device 10 is configured to convert a lighting beam L1 into an image beam L4 and projecting the image beam L4 out of the projection device 10.

The lighting module 100 includes a light source module 110, a reflective diffusion device 120, and a wavelength conversion device 130. The lighting module 100 is configured to provide a lighting beam L3. The light source module 110 is configured to emit the excitation light beam L1. In this embodiment, the light source module 110 is, for example, one or more excitation light-emitting elements. The excitation light emitted by the light source module 110 is, for example, blue light, but may also be light beams of other colors, which is not limited thereto.

The reflective diffusion device 120 is adapted for reflecting and diffusing the excitation light beam L1 emitted from the light source module 110 to form a diffused light beam L2. Generally speaking, due to the high energy density of the excitation light, it is easy to form a concentrated speckle, which affects the imaging quality. The excitation light beam L1 from the light source module 110 is dispersed into a diffused light beam L2 after passing through the reflective diffusion device 120, and the energy density is thus reduced to achieve the effect of eliminating the speckle.

The wavelength conversion device 130 is disposed on the transmission path of the diffused light beam L2 to convert the diffused light beam L2 into a converted light beam. The wavelength conversion device 130 is, for example, a phosphor wheel, and may be disposed with at least one wavelength conversion region and at least one non-wavelength conversion region. The at least one wavelength conversion region and the at least one non-wavelength conversion region may alternately be located on the transmission path of the diffused light beam L2. For example, phosphor is disposed on the at least one wavelength conversion region, and when the at least one wavelength conversion region is located on the transmission path of the diffused light beam L2, the incident diffused light beam L2 may be converted into converted light beams of different wavelengths. For example, the blue diffused light beam L2 is converted into a yellow converted light beam, but the wavelength type is not limited thereto, and may be adjusted according to design requirements. The converted light beam is successively transmitted out of the lighting module 100, and at this time sequence, the converted light beam serves as the lighting beam L3 provided by the lighting module 100. When at least one non-wavelength conversion region is located on the transmission path of the diffused light beam L2, the diffused light beam L2 may, for example, be reflected, or transmitted through the non-wavelength conversion region and be transmitted out of the lighting module 100, and at this time sequence, the diffused light beam L2 serves as the lighting beam L3 provided by the lighting module 100, that is, the lighting beam L3 may be a converted light beam or a diffused light beam L2 at a different time sequence.

The light valve 200 is disposed on a path of the lighting beam L3 to convert the lighting beam L3 into an image beam L4. In this embodiment, the light valve 200 is, for example, a reflective light modulator such as a digital micro-mirror device (DMD) or a liquid crystal on silicon panel (LCoS panel). In some embodiments, the light valve 200 may also be a transmissive optical modulator, such as a liquid crystal display panel, an electro-optical modulator, a magneto-optical modulator, or an acousto-optic modulator (AOM), etc. The disclosure is not limited thereto. Of course, the light valve 200 may also be other optical lenses, which is not limited thereto.

The projection lens 300 is disposed on the path of the image beam L4 from the light valve 200, and is used to project the image beam L4 out of the projection device 10 to be displayed on a screen, a wall, or other projection targets. In this embodiment, the projection lens 300 includes, for example, a combination of one or more reflective surface optical lenses with diopter, such as various combinations of non-planar lenses such as biconcave lenses, biconvex lenses, meniscus lenses, convex-concave lenses, plano-convex lenses, and plano-concave lenses. In one embodiment, the projection lens 300 may also include a flat optical lens, which projects the image beam L4 from the light valve 200 out of the projection device 10 by reflection or transmission.

Figure 2A:
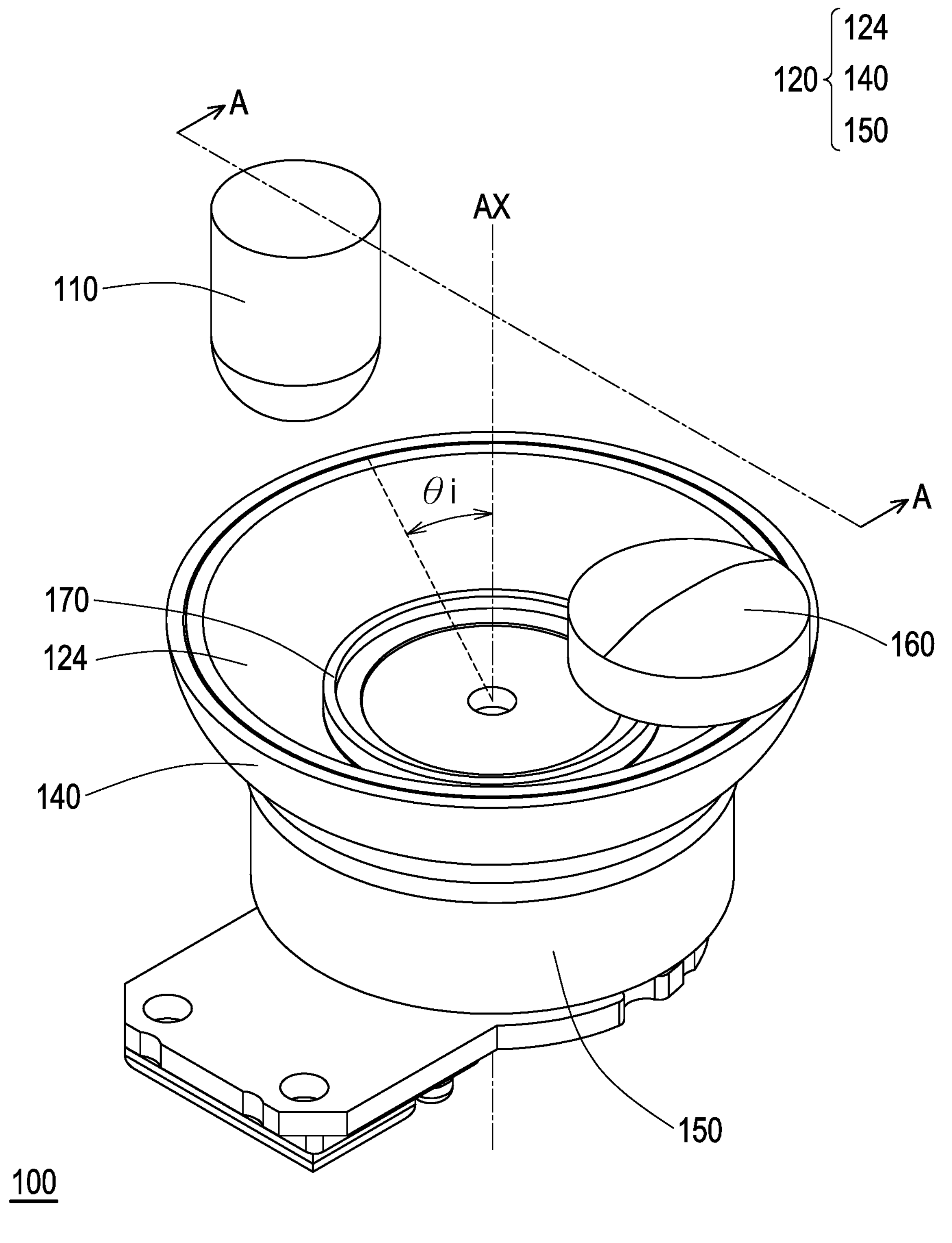
FIG. 2A is a three dimensional schematic diagram of a portion of the lighting module of the projection device of FIG. 1.
Figure 2B:
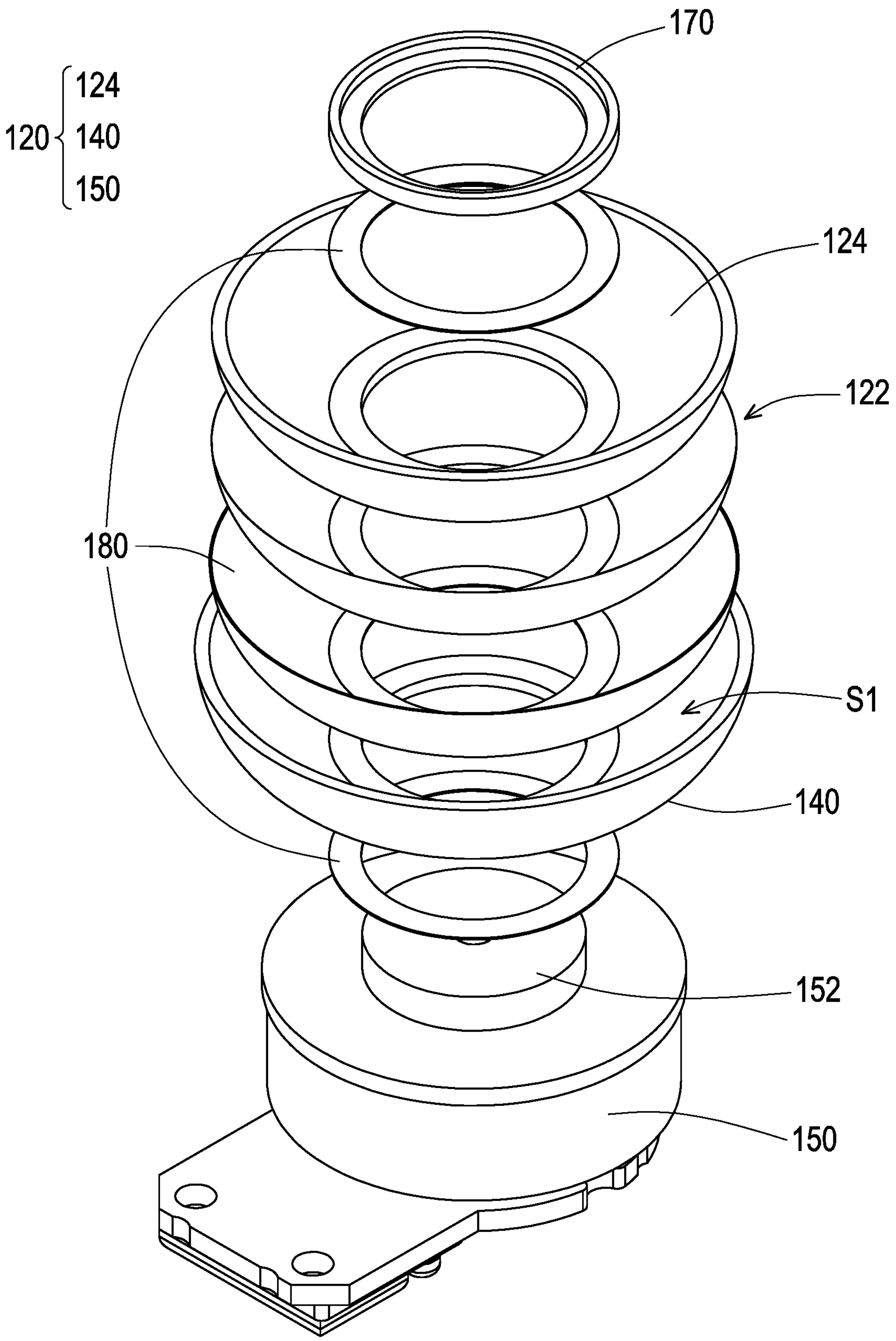
FIG. 2B is an exploded schematic diagram of FIG. 2A.

FIG. 2A is a three dimensional schematic diagram of a portion of the lighting module 100 of the projection device of FIG. 1. FIG. 2B is an exploded schematic diagram of FIG. 2A. It should be noted that the light source and lens in FIG. 2B are hidden.

Referring to FIG. 2A to FIG. 2B, in this embodiment, the reflective diffusion device 120 includes a reflecting member 140 (FIG. 2B), a diffusing member 124, and a driving element 150. A reflective member 140 is disposed on the driving element 150. The reflecting member 140 has a central axis AX and includes a reflective surface S1 (FIG. 2B) facing the light source module 110, in which an included angle θi greater than 0 degrees and less than 90 degrees is between the reflective surface S1 and the central axis AX. The reflecting member 140 is, for example, a metal heat-dissipating substrate, and its material may be ceramic, metal, or a composite material with reflective ability, which is configured to reflect the excitation light beam L1 (FIG. 1) emitted by the light source module 110, but the type and material of the reflecting member 140 are not limited thereto. The reflecting member 140 may be formed by processes such as stamping, machining, casting, die casting, or injection, but the forming method of the reflecting member 140 is not limited thereto. In addition, the reflective surface S1 in this embodiment is ring-shaped around the central axis AX, and the reflective surface S1 is a bowl-shaped curved surface, but the geometrical shape of the reflective surface S1 is not limited thereto. It should be noted that, since the reflective surface S1 of the reflecting member 140 in this embodiment is a bowl-shaped curved surface, the included angle θi is defined as the included angle between the central axis AX and the line connecting any point on the edge of the bowl-shaped reflecting member 140 and the center of the upper surface of the rotating shaft 152 (FIG. 2B) of the driving element 150.

The diffusing member 124 is conformally disposed on the entire reflective surface S1 of the reflecting member 140, for example, the diffusing member 124 is conformally disposed on the reflecting member 140 by coating, adhering, or back-plating. The diffusing member 124 may be a light-transmitting material with microstructures located on the surface, or an atomized layer containing scattering particles, or a combination of the aforementioned light-transmitting material and the atomized layer, configured to diffuse the excitation light beam L1 emitted from the light source module 110. For example, the diffusing member 124 may be fabricated by method such as glass etching, organic adhesive mixed material, and inorganic adhesive mixed diffusion material, and the diffusion material may be silicon oxide or ceramic material. Of course, the material and structure of the diffusing member 124 are not limited thereto, and depend on design requirements.

In this embodiment, the driving element 150 of the reflective diffusion device 120 of the lighting module 100 is, for example, a motor, which has a rotating shaft 152 (FIG. 2B), and the rotating shaft 152 is collinear with the central axis AX. The reflecting member 140 and the diffusing member 124 are disposed on the rotating shaft 152 of the driving element 150. When the driving element 150 rotates, the reflecting member 140 and the diffusing member 124 may be driven to rotate around the central axis AX, so that the excitation light beam L1 incident on the reflective diffusion device 120 forms a diffused light beam L2 (FIG. 1).

Figure 2C:
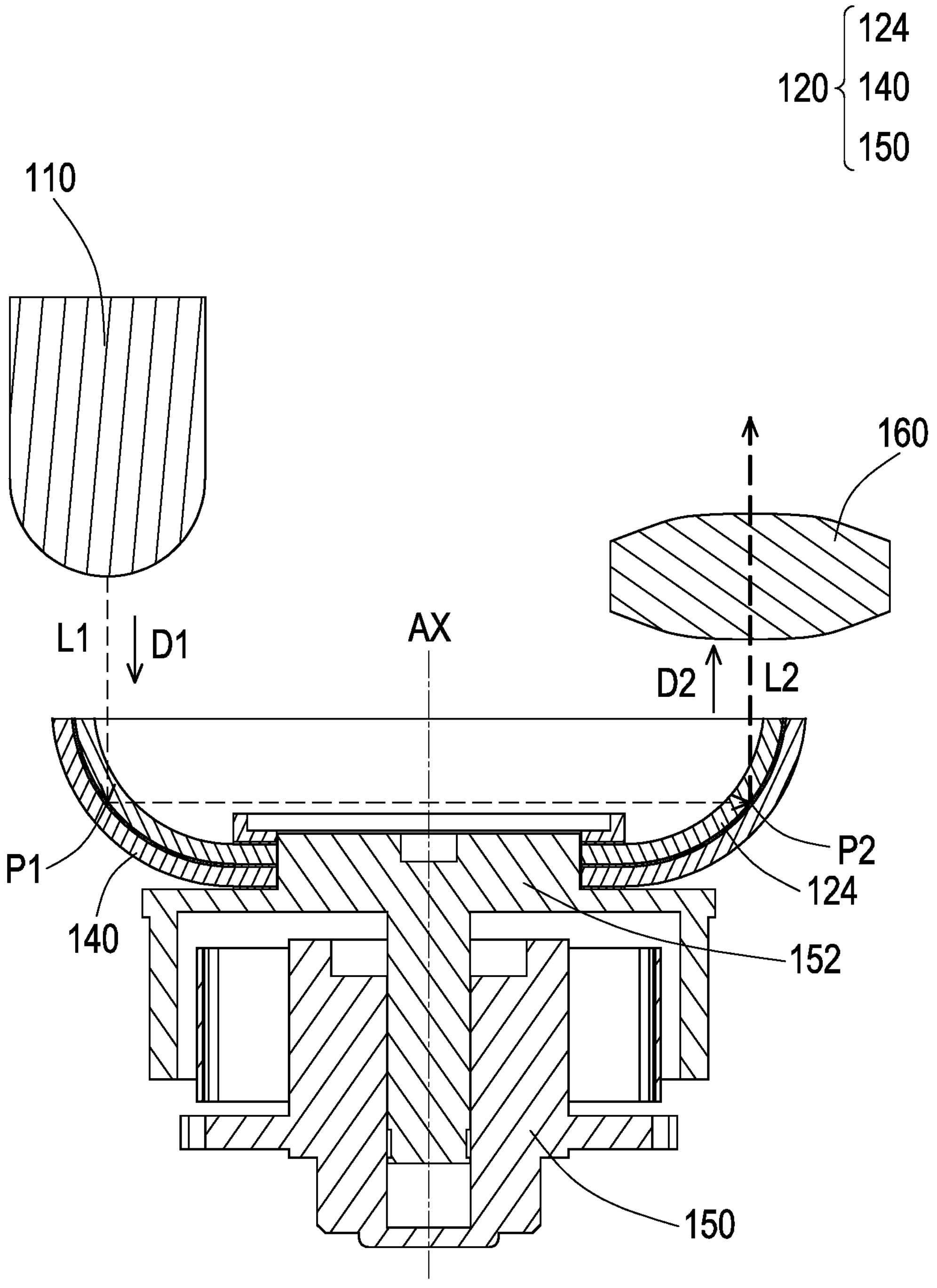
FIG. 2C is a cross-sectional schematic diagram of FIG. 2A along line A-A.

FIG. 2C is a cross-sectional schematic diagram of FIG. 2A along line A-A. Referring to FIG. 2C, in detail, the light source module 110 is disposed above the diffusing member 124 and not located on the central axis AX, and the diffusing member 124 is located between the reflecting member 140 and the light source module 110. The excitation light beam L1 is emitted by the light source module 110, which is first incident on a first position P1 of the diffusing member 124 in an incident direction D1 parallel to the central axis AX, and is transmitted to the reflective surface S1 of the reflecting member 140 (FIG. 2B) to form a diffused light beam L2. The diffused light beam L2 is reflected by the reflecting member 140, transmitted through the diffusing member 124 corresponding to the first position P1, exits the diffusing member 124, and then is incident on a second position P2 of the diffusing member 124 again. The diffused light beam L2 is transmitted to the reflective surface S1 of the reflecting member 140 and is reflected by the reflecting member 140 to transmit through the diffusing member 124 corresponding to the second position P2 and exit from the diffusing member 124 along an exit direction D2 parallel to the central axis AX. In this embodiment, the first position P1 and the second position P2 are symmetrical to the central axis AX.

Due to the design of two reflections, the incident direction D1 and the exit direction D2 of the excitation light beam L1 are located on the same side of the reflective diffusion device 120, and the excitation light beam L1 does not transmit through the reflective diffusion device 120, saving space in the direction of the central axis AX, so that the internal space utilization of the projection device 10 is more flexible. The actual test shows that the volume of the projection device 10 may be reduced by more than 10% compared with that of the conventional projection device, which facilitates the reduction the weight and cost.

It is worth noting that the excitation light beam L1 passes through the diffusing member 124 during the process of being incident on or exiting from the reflecting member 140. The excitation light beam L1 is incident on the diffusing member 124 in, for example, a collimated state, and passes through the diffusing member 124 to form a light beam having a diffusing angle of, for example, 1.5 degrees. When the excitation light beam L1 is incident on and exits from the first position P1, it passes through the diffusing member 124 twice, that is, the diffused light beam L2 is formed by the excitation light beam L1 undergoing two diffusions, so that the diffused light beam L2 exiting from the first position P1 has a diffusing angle of 3 degrees. Likewise, when the diffused light beam L2 is incident on and exits from the second position P2, it also passes through the diffusing member 124 twice, so the diffused light beam L2 undergoes two further diffusions, so that the diffused light beam L2 exiting from the second position P2 has a diffusing angle of 6 degrees. Of course, the degree of the diffusing angle of the light beam after passing through the diffusing member 124 is not limited thereto, and depends on the actual design requirements. Therefore, only a single diffusing member 124 is required to be disposed in the reflective diffusion device 120 of the lighting module 100, and the diffusing angle of the light beam may be twice as large as that of the transmissive diffusion sheet or diffusion wheel, forming a diffused light beam L2 with sufficient diffusing effect, effectively eliminating the speckle.

In addition, the reflective diffuser 120 of this embodiment may not only change the material and structure of the diffusing member 124, but also adjust the degree of the included angle between the reflective surface S1 of the reflecting member 140 and the incident direction D1, so as to achieve the adjustment of the light beam diffusion path, thus the design is quite flexible. In addition, in the conventional projection device, the radial dimension of the transmissive diffusion sheet or diffusion wheel must generally be greater than the radial dimension of the driving element, so as to prevent the driving element from blocking the excitation light beam transmitting through the diffusion sheet or the diffusion wheel. In contrast, the excitation light beam L1 of this embodiment does not transmit through the reflecting member 140, so the driving element 150 located under the reflecting member 140 and the diffusing member 124 does not hinder the traveling of the excitation light beam L1. Therefore, the dimension of the diffusing member 124 may be greatly reduced. According to the actual test, the volume of the diffusing member 124 of the reflective diffusion device 120 may be reduced by more than 30% compared with the conventional transmissive diffusion sheet or diffusion wheel, which facilitates space utilization and cost saving.

After the diffused light beam L2 exits the reflective diffusion device 120, it is incident on and transmitted through a lens 160. The lens 160 is disposed above the diffusing member 124, and the lens 160 and the light source module 110 are symmetrical to the central axis AX. The lens 160 is, for example, a collimating lens, which may convert the diffused light beam L2 into a parallel beam, but the type and function of the lens 160 are not limited thereto. After transmitting through the lens 160, the diffused light beam L2 enters the subsequent optical path system (not shown) for further utilization and processing. For example, the diffused light beam L2 may serve as the lighting beam L3 provided by the lighting module 100.

Referring to FIG. 2B and FIG. 2C, the reflective diffusion device 120 of the lighting module 100 of this embodiment further includes a reflective layer 122 and multiple adhesive layers 180. The diffusing member 124 is fixed to the reflecting member 140 through the adhesive layer 180, and the reflecting member 140 is fixed to the driving element 150 through the adhesive layer 180, used to dissipate the heat generated by the excitation light beam L1 (FIG. 2C) incident on the reflecting member 140, so as to prevent the driving element 150 from being damaged or suspending operation due to overheating. The reflective layer 122 is disposed between the reflecting member 140 and the diffusing member 124 for enhancing the light reflecting effect of the reflecting member 140.

The adhesive layer 180 in this embodiment is, for example, a coating layer or an adhesive layer, used to fix the diffusing member 124 on the reflective layer 122 or/and the reflective member 140, but the type of the adhesive layer 180 is not limited thereto.

In addition, the lighting module 100 further includes an adapter 170. The adapter 170 is connected to the driving element 150, and the adapter 170 fixes the diffusing member 124 and the reflecting member 140 on the rotating shaft 152 of the driving element 150 through the adhesive layer 180. The adapter 170 has the function of balance calibration. In detail, the adapter 170 is used to be filled with adhesive or metal to balance the eccentricity of the reflective diffusion device 120 when it rotates, to calibrate and fix the element to serve as a frame. In addition, the adapter 170 enhances the connection between the diffusing member 124 and the driving element 150, and a gap (not shown) is between the adapter 170 and the diffusing member 124 in the radial direction, which may prevent the diffusing member 124 from being broken due to thermal expansion and contraction against the driving element 150.

Figure 3A:
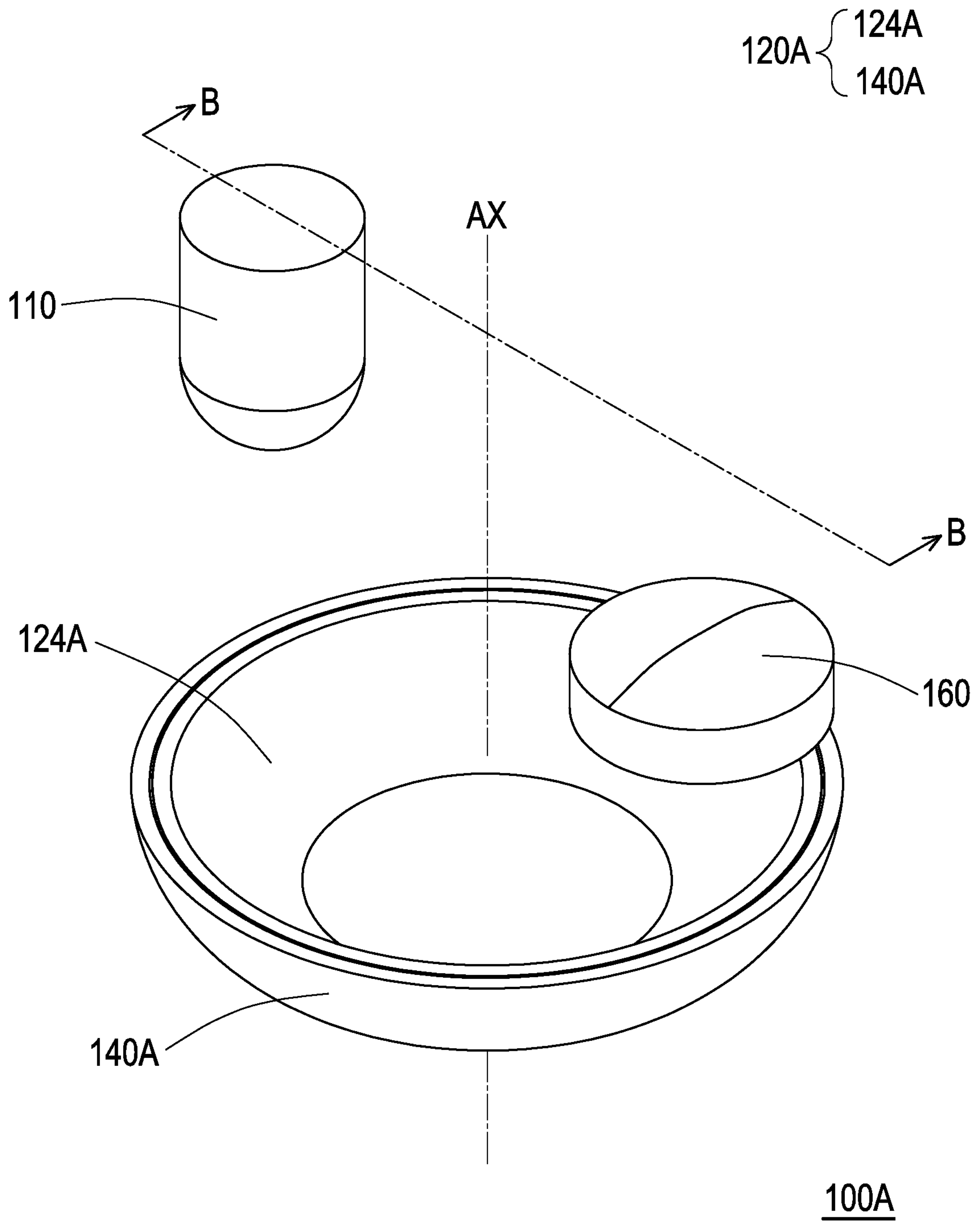
FIG. 3A is a three dimensional schematic diagram of a portion of a lighting module according to another embodiment of the invention.
Figure 3B:
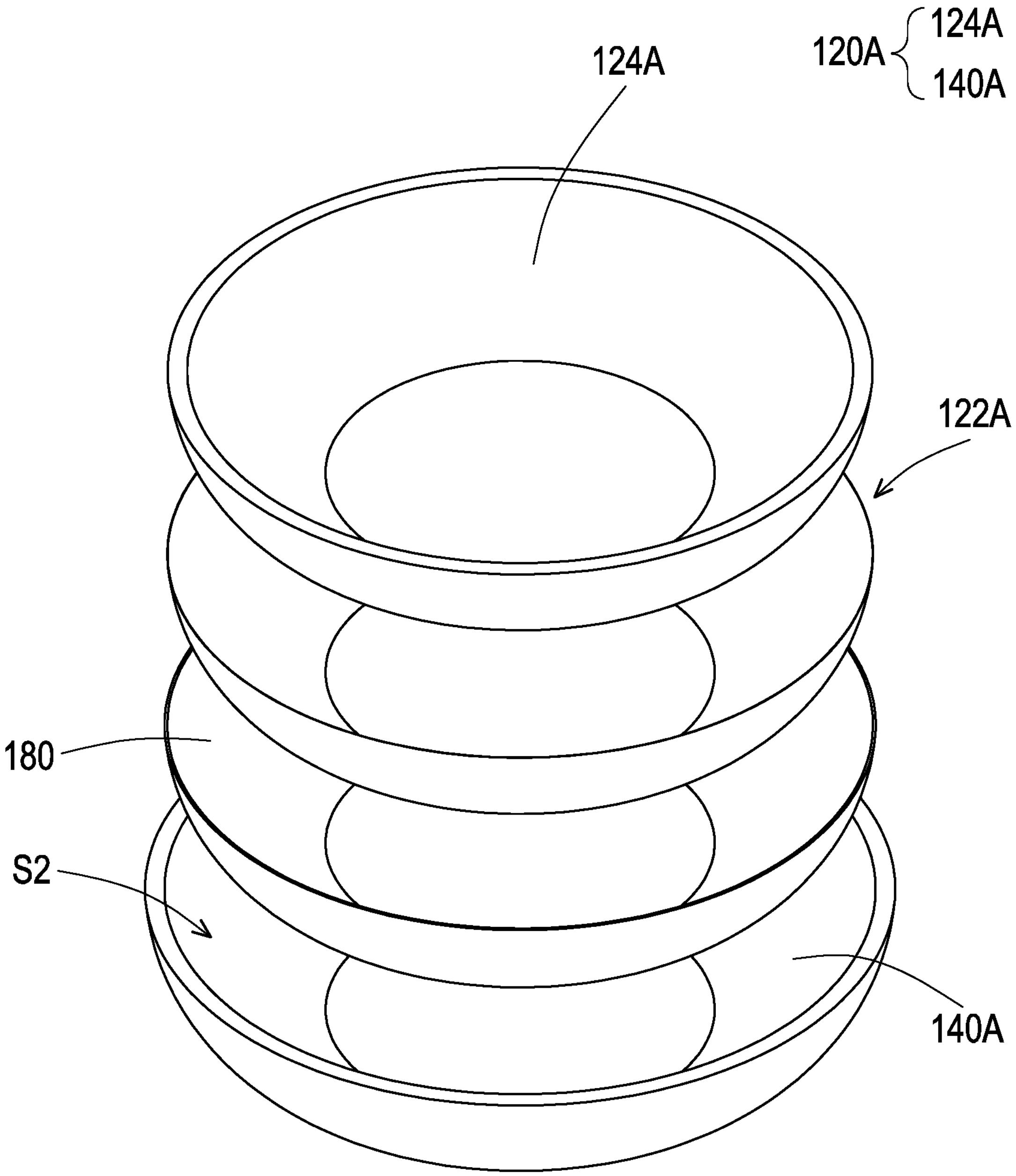
FIG. 3B is an exploded schematic diagram of FIG. 3A.

FIG. 3A is a three dimensional schematic diagram of a portion of a lighting module according to another embodiment of the invention. FIG. 3B is an exploded schematic diagram of FIG. 3A. It should be noted that the light source module and the lens in FIG. 3B are hidden. Referring to FIG. 3A and FIG. 3B, the lighting module 100A of this embodiment is similar to the aforementioned lighting module 100, and the main difference between the two is that the driving element 150 is not disposed in the reflective diffusion device 120A of the lighting module 100A. In other words, during the operation of the lighting module 100A, the reflecting member 140A (FIG. 3B) of the reflective diffusion device 120A and the diffusing member 124A remain stationary. Since the driving element 150 is not disposed in the reflective diffusion device 120A of the lighting module 100A and the adapter 170 is not required, space and cost may be further saved.

Figure 3C:
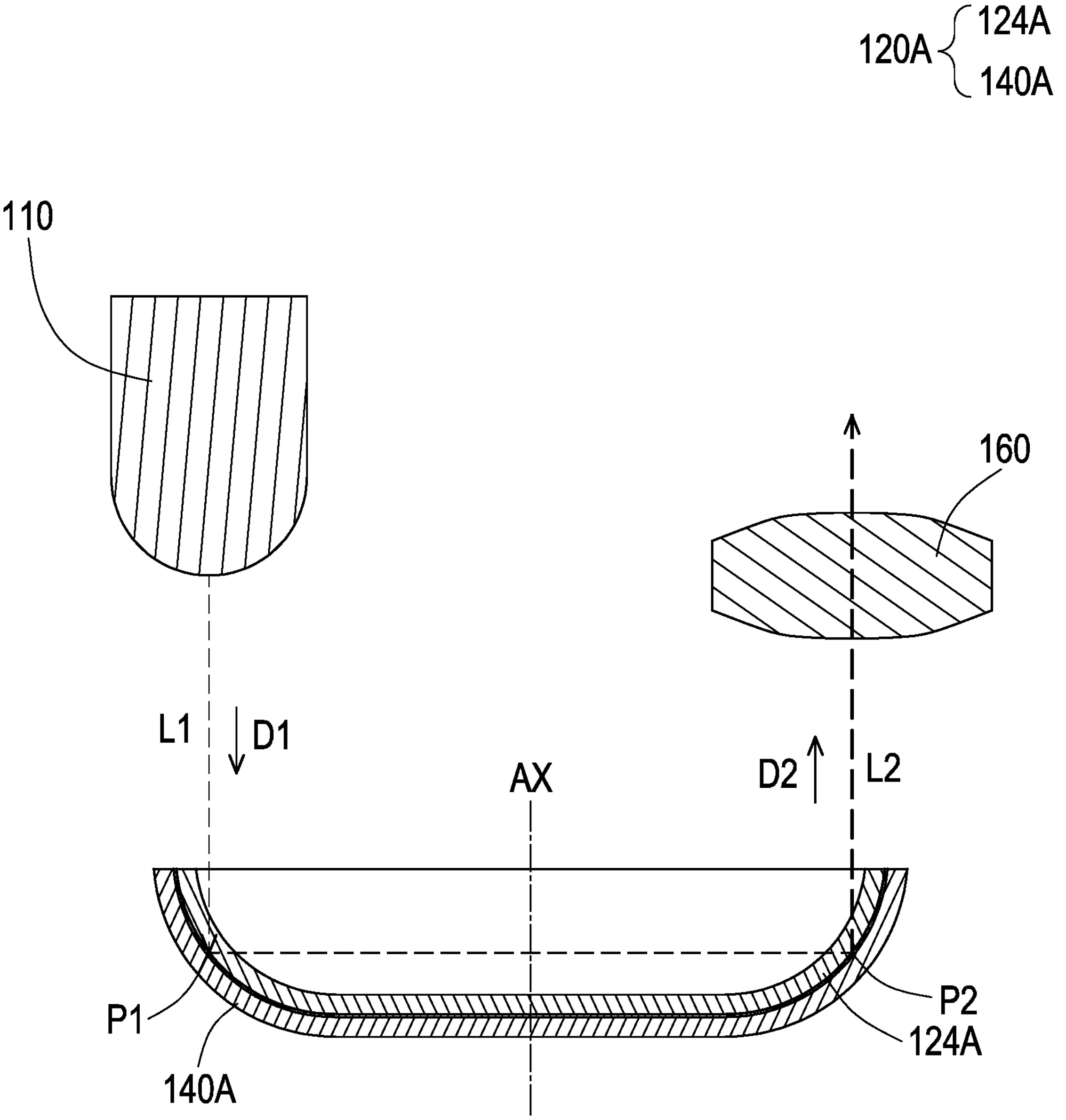
FIG. 3C is a cross-sectional schematic diagram of FIG. 3A along line B-B.

FIG. 3C is a cross-sectional schematic diagram of FIG. 3A along line B-B. Similar to the reflection and diffusion method of the aforementioned reflective diffusion device 120, in this embodiment, the excitation light beam L1 is emitted by the light source module 110, which is first incident on a first position P1 of the diffusing member 124A in an incident direction D1 parallel to the central axis AX, and is transmitted to the reflective surface S2 of the reflecting member 140A (FIG. 3B) to form a diffused light beam L2. The diffused light beam L2 is reflected by the reflecting member 140A, transmitted through the diffusing member 124A corresponding to the first position Pb, exits the diffusing member 124A, and then is incident on a second position P2 of the diffusing member 124A again. The diffused light beam L2 is transmitted to the reflective surface S2 of the reflecting member 140A and is reflected by the reflecting member 140A to transmit through the diffusing member 124A corresponding to the second position P2 and exit from the diffusing member 124A along an exit direction D2 parallel to the central axis AX. In this embodiment, the reflective diffusion device 120A further includes a reflective layer 122A and multiple adhesive layers 180. The diffusing member 124A is fixed to the reflecting member 140A through the adhesive layer 180, and the reflective layer 122A is disposed between the reflecting member 140A and the diffusing member 124A for enhancing the light reflecting effect of the reflecting member 140A.

Figure 4A:
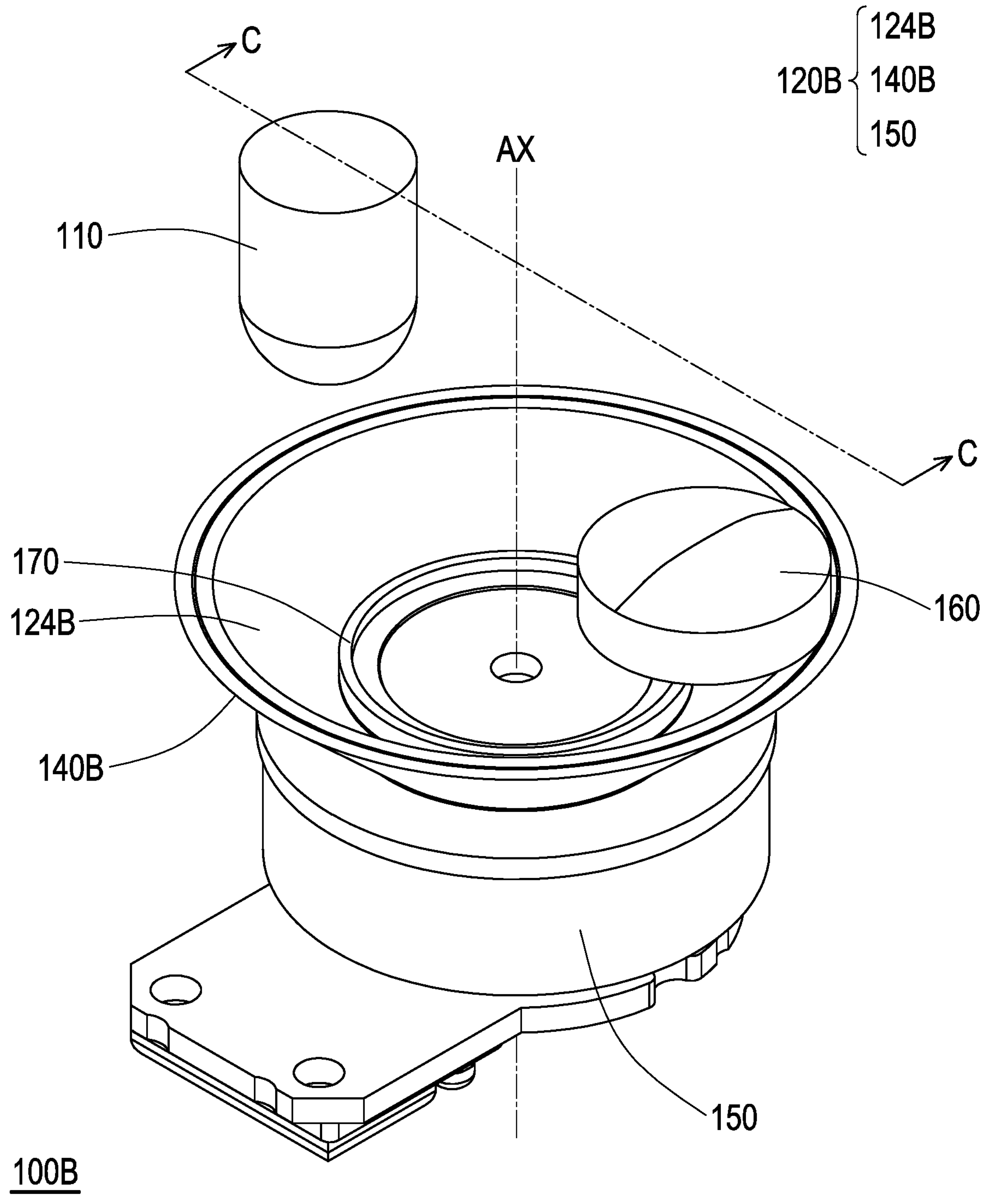
FIG. 4A is a three dimensional schematic diagram of a portion of a lighting module according to another embodiment of the invention.
Figure 4B:
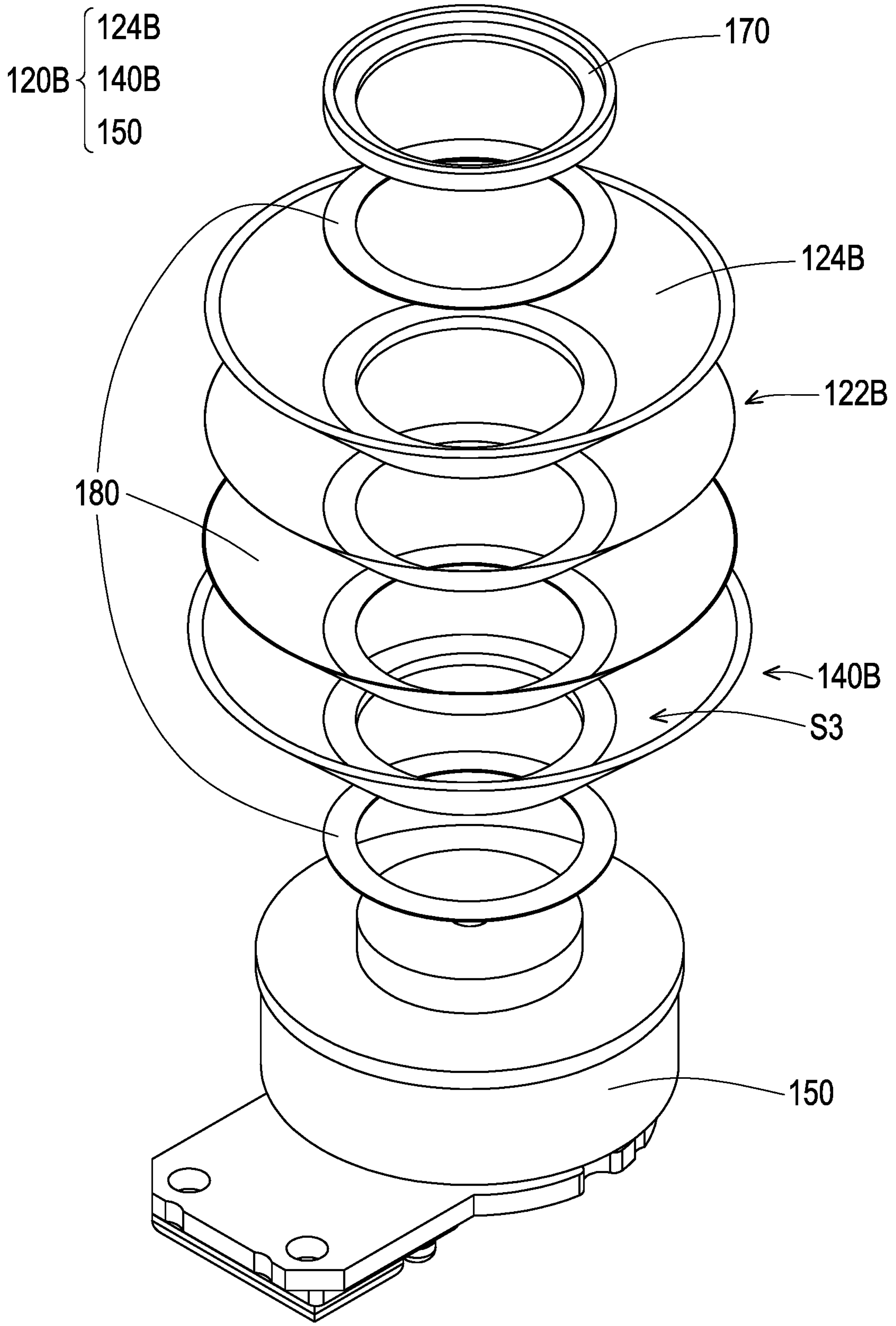
FIG. 4B is an exploded schematic diagram of FIG. 4A.

FIG. 4A is a three dimensional schematic diagram of a portion of a lighting module according to another embodiment of the invention. FIG. 4B is an exploded schematic diagram of FIG. 4A. It should be noted that the light source and lens in FIG. 4B are hidden. Referring to FIG. 4A and FIG. 4B, the lighting module 100B of this embodiment is similar to the aforementioned lighting module 100, the difference between the two is that the reflective surface S3 (FIG. 4B) of the reflecting member 140B of the reflective diffusion device 120B of the lighting module 100B is at least a portion of a conical surface, in which at least a portion of the conical surface refers to the annular conical surface formed by a cone without an apex. In other words, the reflective surface S3 is an inclined surface rather than a curved surface, and the distance between the reflective surface S3 and the central axis AX is larger toward the direction away from the driving element 150.

Figure 4C:
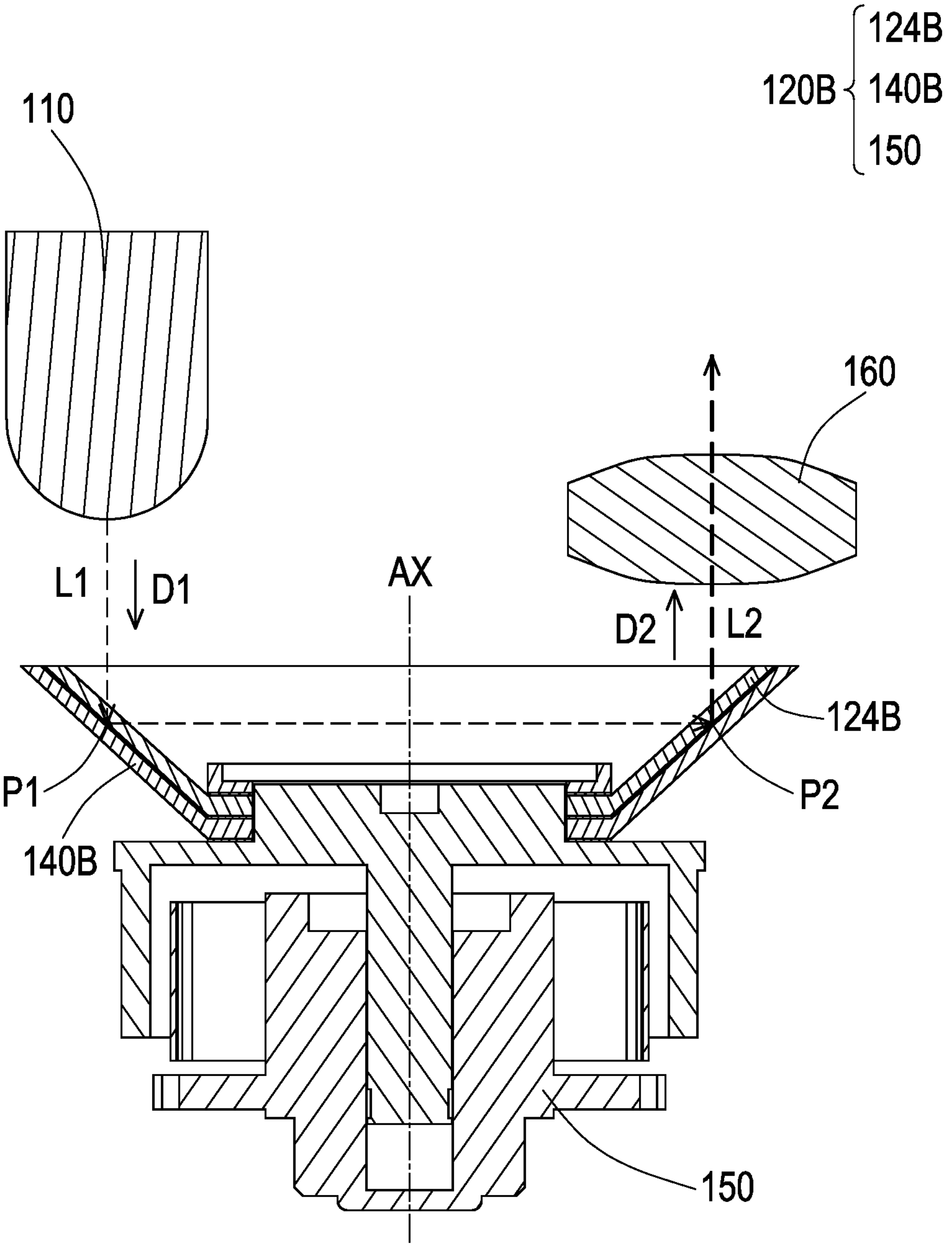
FIG. 4C is a cross-sectional schematic diagram of FIG. 4A along line C-C.

FIG. 4C is a cross-sectional schematic diagram of FIG. 4A along line C-C. Similar to the reflection and diffusion method of the aforementioned reflective diffusion device 120, the excitation light beam L1 is emitted by the light source module 110, which is first incident on a first position P1 of the diffusing member 124B in an incident direction D1 parallel to the central axis AX, and is transmitted to the reflective surface S3 of the reflecting member 140B (FIG. 4B) to form a diffused light beam L2. The diffused light beam L2 is reflected by the reflective layer 122B, transmitted through the diffusing member 124B corresponding to the first position P1, exits the diffusing member 124B, and then is incident on a second position P2 of the diffusing member 124B. The diffused light beam L2 is transmitted to the reflective surface S3 of the reflecting member 140B and is reflected by the reflecting member 140B to transmit through the diffusing member 124B corresponding to the second position P2 and exit from the diffusing member 124B along an exit direction D2 parallel to the central axis AX. In this embodiment, the reflective diffusion device 120B further includes a reflective layer 122B and multiple adhesive layers 180. The diffusing member 124B is fixed to the reflecting member 140B through the adhesive layer 180, and the reflective layer 122B is disposed between the reflecting member 140B and the diffusing member 124B for enhancing the light reflecting effect of the reflecting member 140B.

Figure 5A:
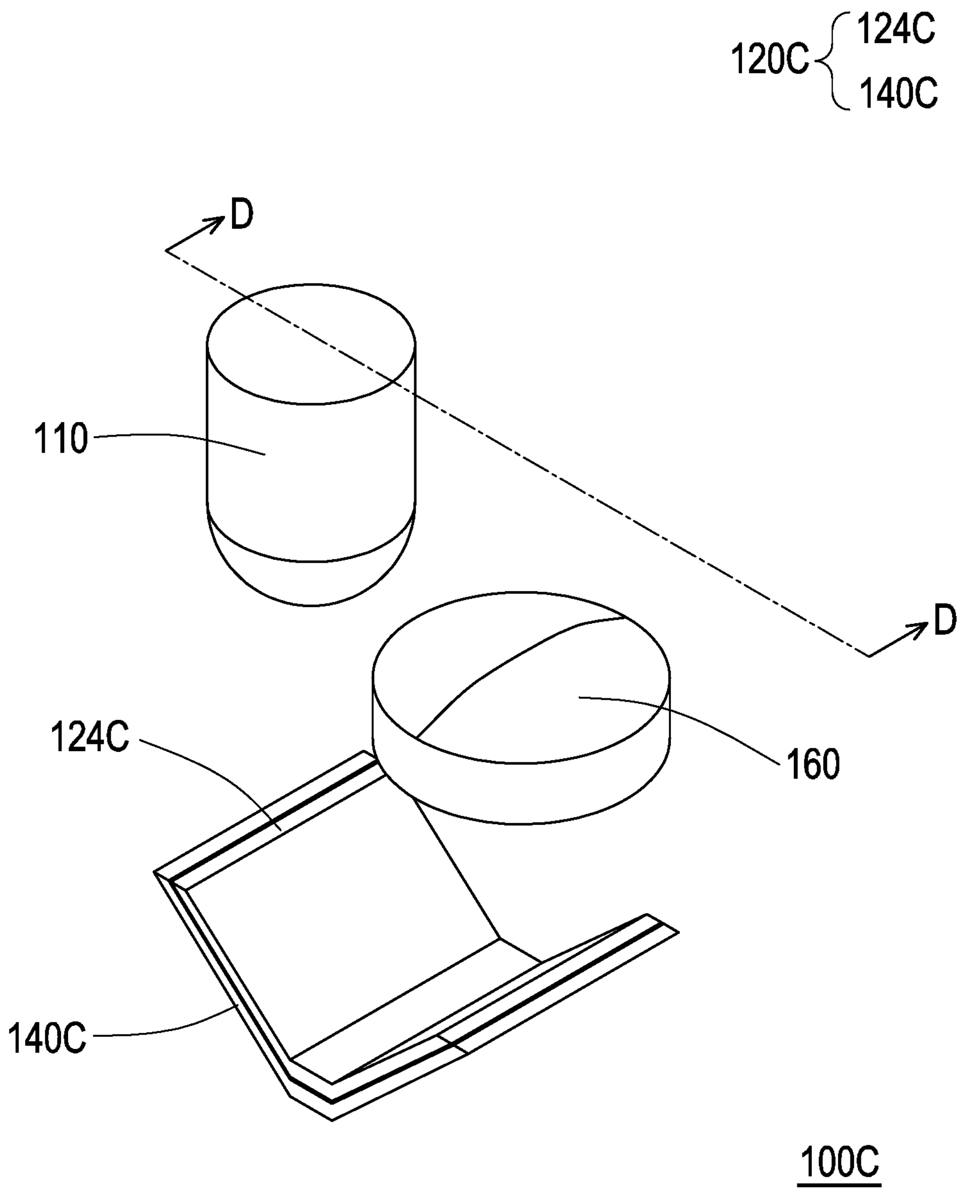
FIG. 5A is a three dimensional schematic diagram of a portion of a lighting module according to another embodiment of the invention.
Figure 5B:
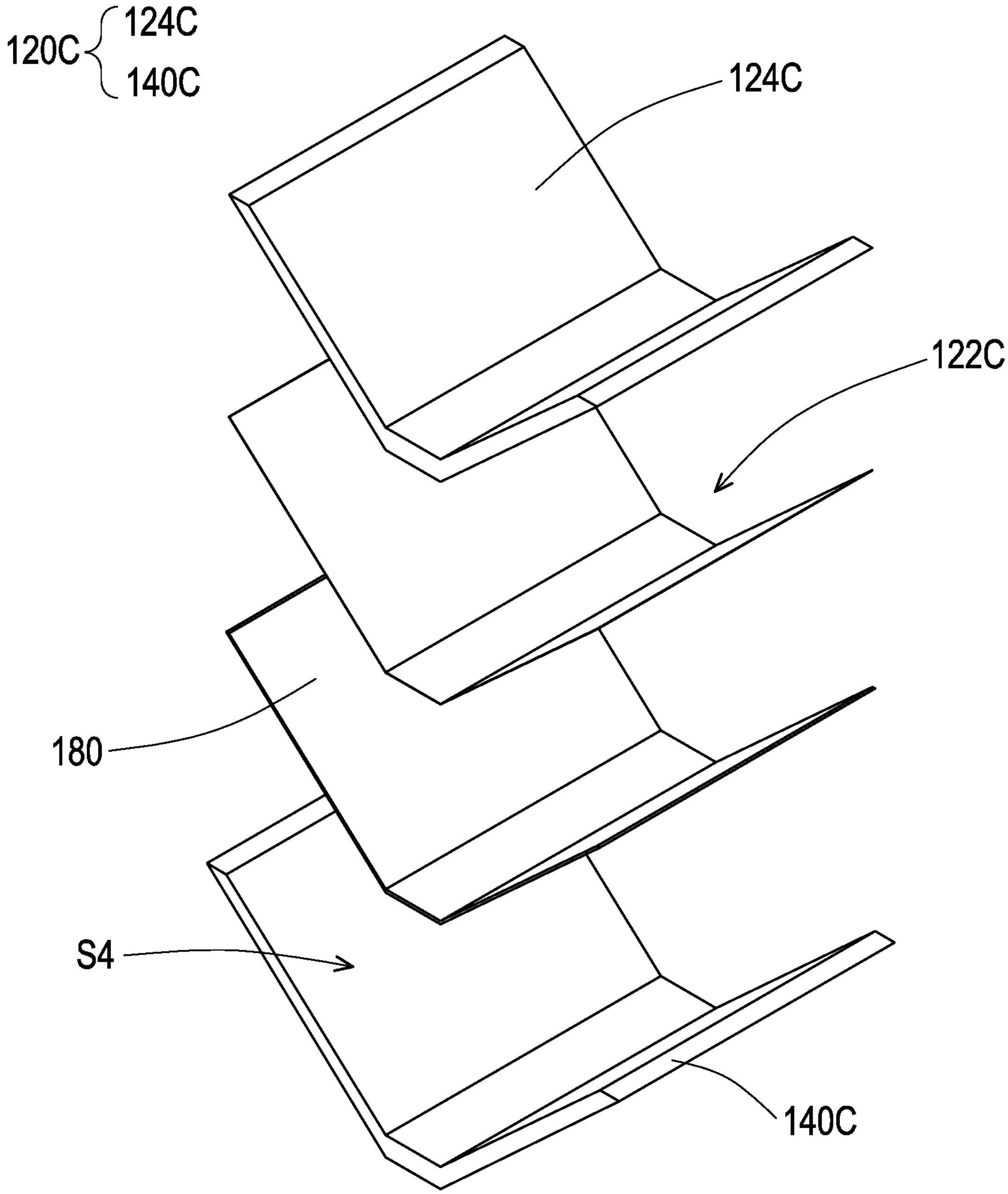
FIG. 5B is an exploded schematic diagram of FIG. 5A.

FIG. 5A is a three dimensional schematic diagram of a portion of a lighting module according to another embodiment of the invention. FIG. 5B is an exploded schematic diagram of FIG. 5A. It should be noted that the light source module 110 and the lens 160 in FIG. 5B are hidden. Referring to FIG. 5A and FIG. 5B, the lighting module 100C of this embodiment is similar to the aforementioned lighting module 100A, the difference between the two is that the reflective surfaces S4 (FIG. 5B) of the reflective diffusion device 120C of the lighting module 100C are two inclined surfaces facing each other. In addition, the reflecting member 140C and the diffusing member 124C in this embodiment are V-shaped.

Figure 5C:
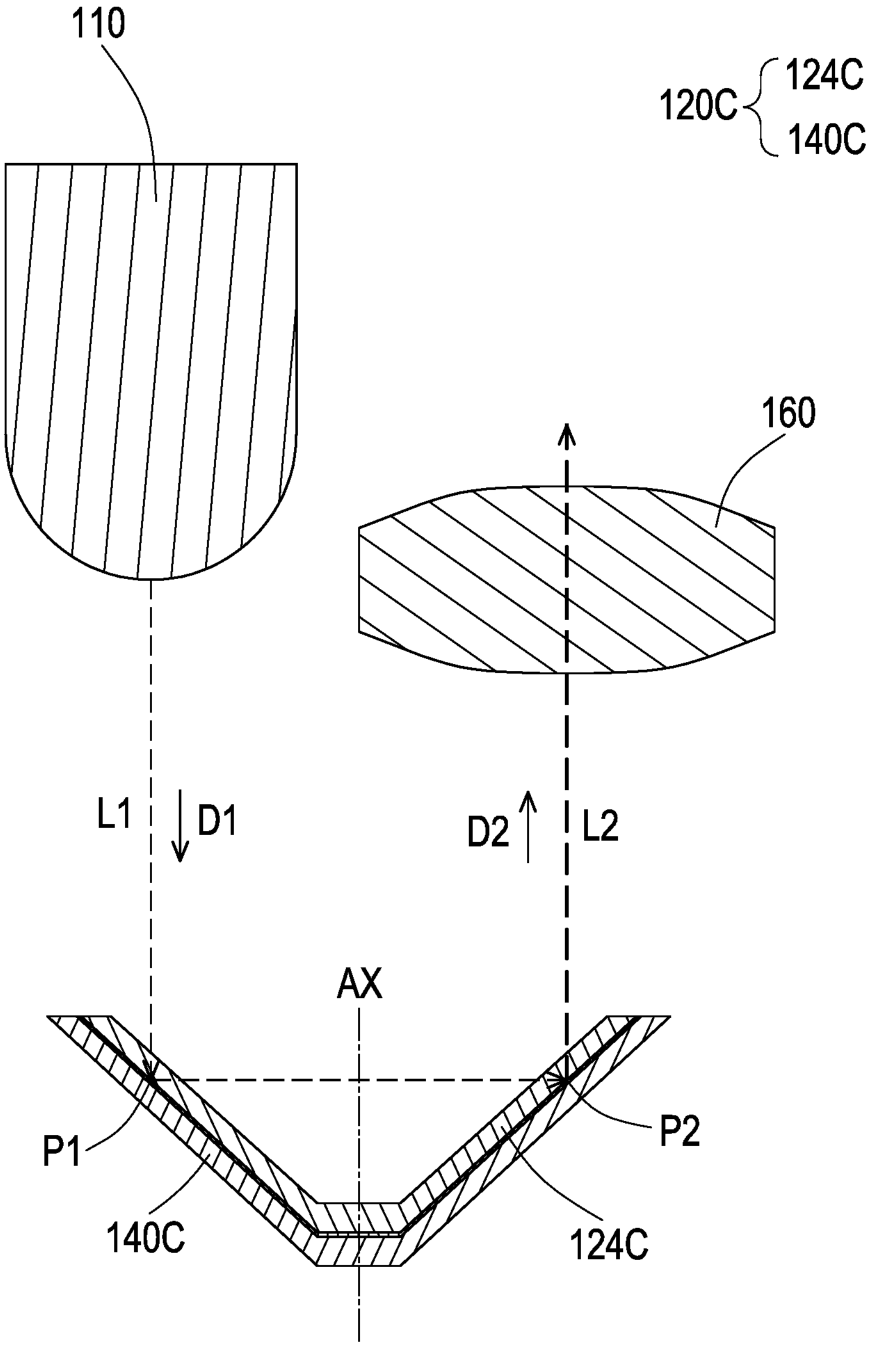
FIG. 5C is a cross-sectional schematic diagram of FIG. 5A along line D-D.

FIG. 5C is a cross-sectional schematic diagram of FIG. 5A along line D-D. Similar to the reflection and diffusion method of the aforementioned reflective diffusion device 120, the excitation light beam L1 is emitted by the light source module 110, which is first incident on a first position P1 (located on one of the two inclined surfaces) of the diffusing member 124C in an incident direction D1 parallel to the central axis AX, and is transmitted to the reflective surface S4 of the reflecting member 140C (FIG. 5B) to form a diffused light beam L2. The diffused light beam L2 is reflected by the reflecting member 140C, transmitted through the diffusing member 124C corresponding to the first position P1, exits the diffusing member 124C, and then is incident on a second position P2 (located on the other one of the two inclined surfaces) of the diffusing member 124C. The diffused light beam L2 is transmitted to the reflective surface S4 of the reflecting member 140C and is reflected by the reflecting member 140C to transmit through the diffusing member 124C corresponding to the second position P2 and exit from the diffusing member 124C along an exit direction D2 parallel to the central axis AX. In this embodiment, the reflective diffusion device 120C further includes a reflective layer 122C and multiple adhesive layers 180. The diffusing member 124C is fixed to the reflecting member 140C through the adhesive layer 180, and the reflective layer 122C is disposed between the reflecting member 140C and the diffusing member 124C for enhancing the light reflecting effect of the reflecting member 140C.

Figure 6A:
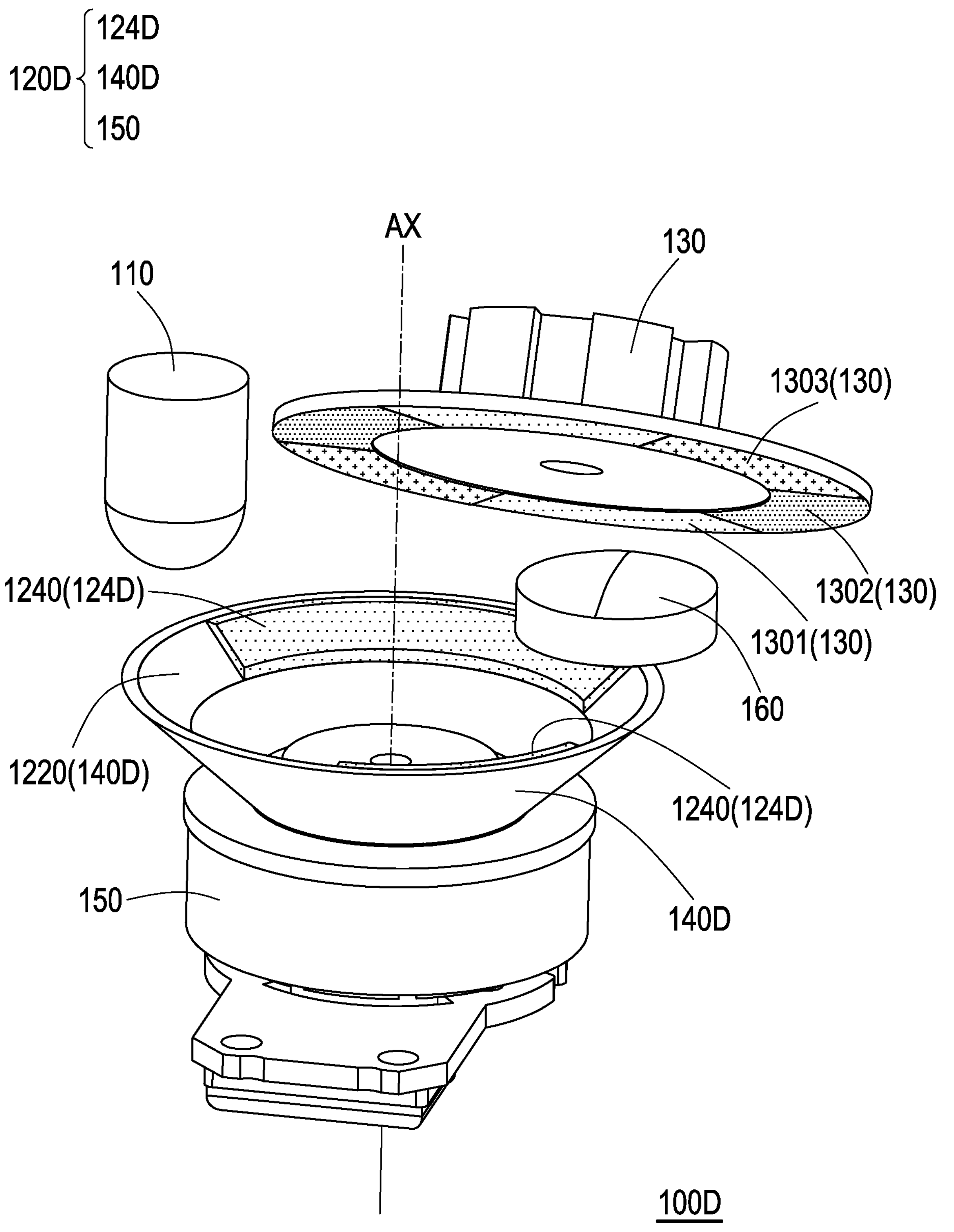
FIG. 6A is a three dimensional schematic diagram of a portion of a lighting module according to another embodiment of the invention.
Figure 6B:
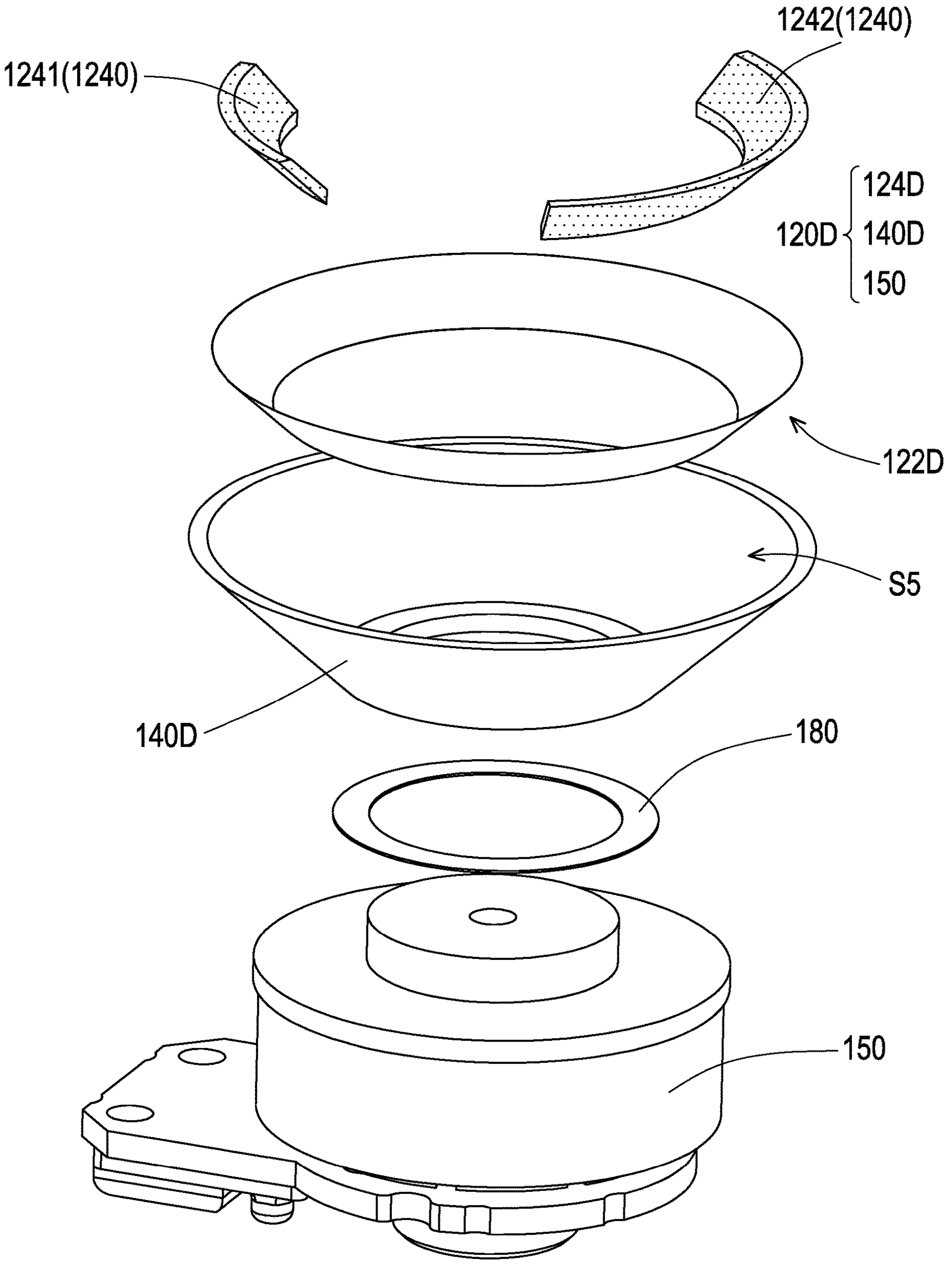
FIG. 6B is an exploded schematic diagram of FIG. 6A from another perspective.

FIG. 6A is a three dimensional schematic diagram of a portion of a lighting module according to another embodiment of the invention. FIG. 6B is an exploded schematic diagram of FIG. 6A from another perspective. It should be noted that the light source module, the lens, and the wavelength conversion device of FIG. 6B are hidden. Referring to FIG. 6A and FIG. 6B, the lighting module 100D of this embodiment is similar to the aforementioned lighting module 100B, the difference between the two is that the diffusing member 124D is disposed on a portion of the reflective surface S5 (FIG. 6B) of the reflecting member 140D to form at least one diffusion section 1240, and the exposed portion of the reflective surface S5 of the reflecting member 140D that is not covered by the diffusing member 124D forms at least one reflection section 1220. The sum of the angle distributed by the diffusion section 1240 with the central axis AX as the center and the angle distributed by the reflection section 1220 with the central axis AX as the center is 360 degrees. Since the diffusing member 124D is not disposed on the entire reflecting member 140D, it facilitates the reduction of weight and cost.

In addition, the lighting module 100D of this embodiment further includes a wavelength conversion device 130, such as a phosphor wheel. The wavelength conversion device 130 includes a first wavelength conversion region 1301, a second wavelength conversion region 1302, and a third wavelength conversion region 1303. The first wavelength conversion region 1301 is, for example, a green phosphorescent region for converting the incident light (diffused light beam or excitation light beam) into green light, the second wavelength conversion region 1302 is, for example, a yellow phosphorescent region for converting the incident light (diffused light beam or excitation light beam) into yellow light, and the third wavelength conversion region 1303 is, for example, a red phosphorescent region for converting the incident light (diffused light beam or excitation light beam) into red light, but the wavelength conversion type of the first wavelength conversion region 1301, the second wavelength conversion region 1302, and the third wavelength conversion region 1303 is not limited thereto. In this embodiment, the reflective diffusion device 120D further includes a reflective layer 122D and an adhesive layer 180. The reflective layer 122D is disposed between the reflecting member 140D and the diffusing member 124D for enhancing the light reflecting effect of the reflecting member 140D.

Figure 7A:
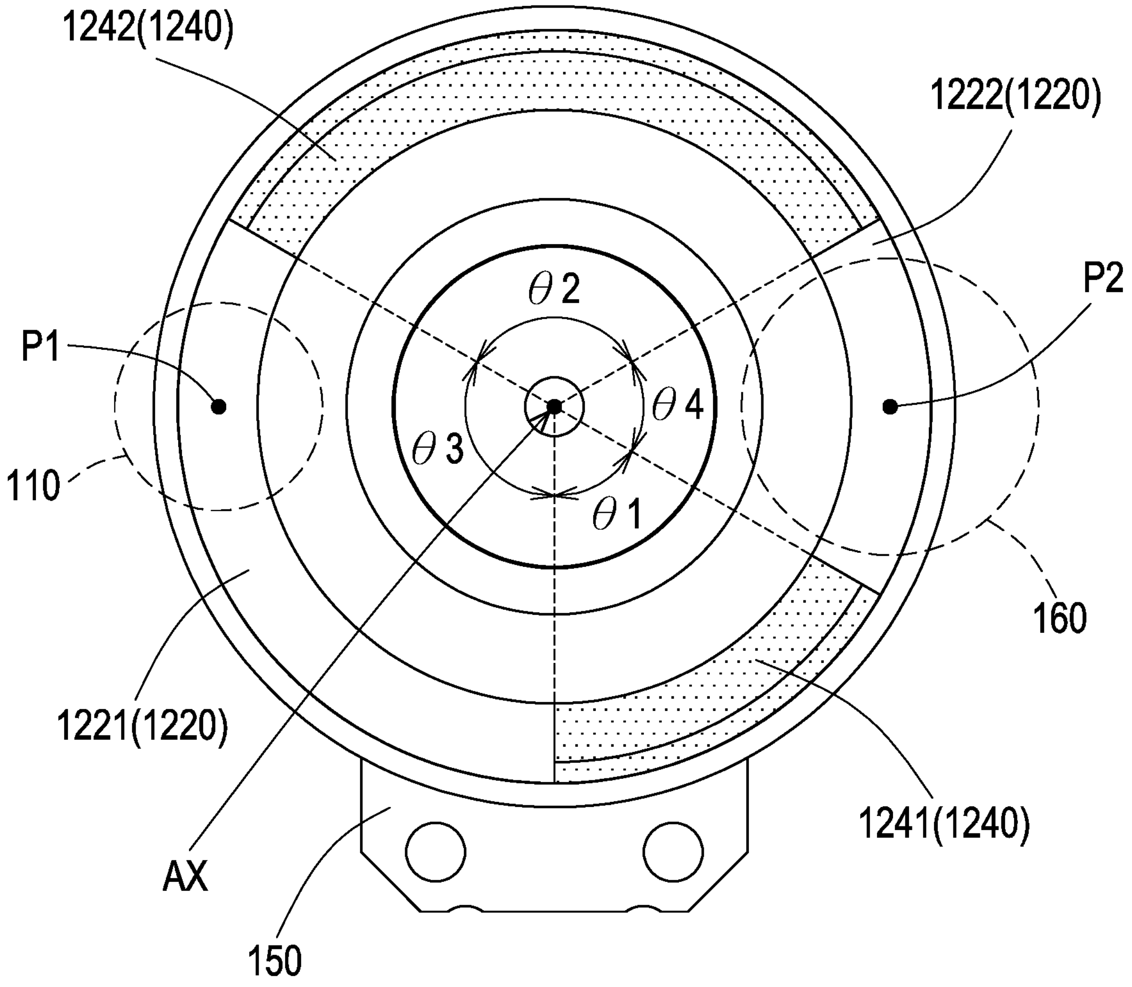
FIG. 7A is a top view of FIG. 6A at a first time sequence.

FIG. 7A is a top view of FIG. 6A at a first time sequence. In order to clearly present the reflective diffusion device, the wavelength conversion device of FIG. 7A is hidden, and the light source module and the lens are shown in dashed lines. Referring to FIG. 6A and FIG. 7A, in this embodiment, the diffusion section 1240 includes a first diffusion section 1241 and a second diffusion section 1242 which are separated. The reflection section 1220 includes a first reflection section 1221 and a second reflection section 1222. The first diffusion section 1241 is located between the first reflection section 1221 and the second reflection section 1222, and the first reflection section 1221 is located between the first diffusion section 1241 and the second diffusion section 1242. The first angle θ1 distributed by the first diffusion section 1241 with the central axis AX as the center may be the same as or different from the second angle θ2 distributed by the second diffusion section 1242 with the central axis AX as the center, or/and the third angle θ3 distributed by the reflection section 1221 with the central axis AX as the center is the same as or different from the fourth angle θ4 distributed by the second reflection section 1222 with the central axis AX as the center.

The first angle θ1 of the first diffusion section 1241 in this embodiment is 60 degrees. The second angle θ2 of the second diffusion section 1242 is 120 degrees. The third angle θ3 of the first reflection section 1221 is 120 degrees. The fourth angle θ4 of the second reflection section 1222 is 60 degrees. Of course, the degrees of the first angle θ1, the second angle θ2, the third angle θ3, and the fourth angle θ4 are not limited thereto, as long as the sum of the first angle θ1, the second angle θ2, the third angle θ3, and the fourth angle θ4 is 360 degrees.

Figure 7B:
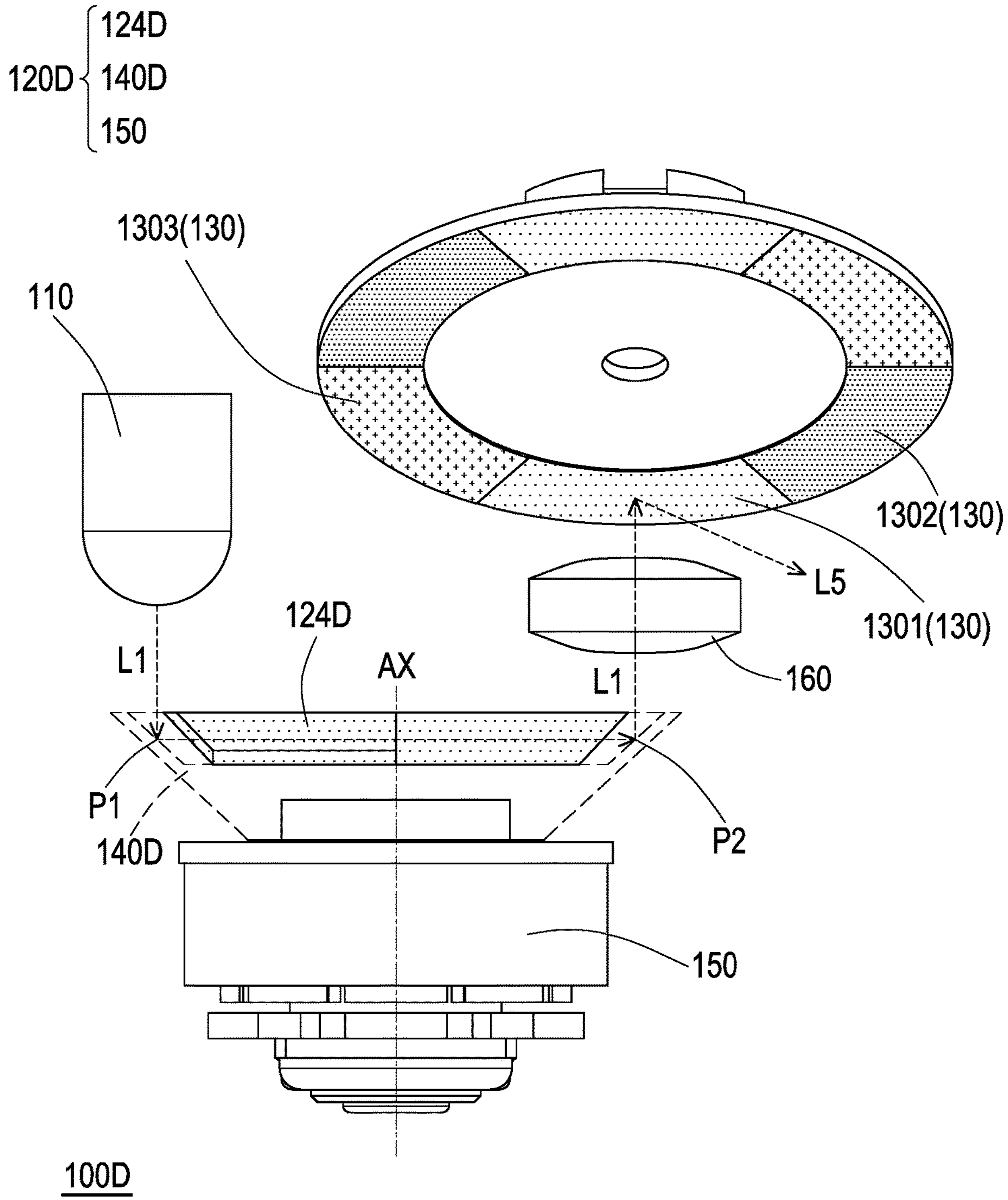
FIG. 7B is a side view of FIG. 6A at a first time sequence.

FIG. 7B is a side view of FIG. 6A at a first time sequence. In order to clearly present the diffusion device, the reflecting member of FIG. 7B is shown in dashed lines. After the excitation light beam L1 is incident on the reflective diffusion device 120D, it may exit from the diffusion section 1240 to form a diffused light beam L2 (FIG. 1) or exit from the reflection section 1220 and remain as the excitation light beam L1. In addition, when the diffused light beam L2 or the excitation light beam L1 is incident on the first wavelength conversion region 1301, the second wavelength conversion region 1302, or the third wavelength conversion region 1303 of the wavelength conversion device 130, it may be converted into converted light beams L5 of different wavelengths.

Referring to FIG. 7A and FIG. 7B, in detail, when the driving element 150 drives the reflecting member 140D and the diffusing member 124D to rotate around the central axis AX, at a first time sequence T1, the first position P1 and the second position P2 are both in the reflection section 1220. For example, the first position P1 is located in the first reflection section 1221, and the second position P2 is located in the second reflection section 1222. In this way, the excitation light beam L1 (FIG. 7B) does not pass through the diffusing member 124D at all during the process of being transmitted from the incident first position P1 to the second position P2 and then exiting from the second position P2, so the excitation light beam L1 is not diffused and maintains a high energy.

On the other hand, the first wavelength conversion region 1301, the second wavelength conversion region 1302, and the third wavelength conversion region 1303 are adapted for alternately being located on the transmission path of the diffused light beam L2 or the excitation light beam L1. At the first time sequence T1, the first wavelength conversion region 1301 (FIG. 7B) is located on the transmission path of the excitation light beam L1 from the second position P2, so that the excitation light beam L1 is incident on the first wavelength conversion region 1301. It is worth mentioning that the heat resistance of the first wavelength conversion region 1301 (e.g., the green phosphorescent region) is higher than that of the second wavelength conversion region 1302 (e.g., the yellow phosphorescent region), and the heat resistance of the second wavelength conversion region 1302 (e.g., the yellow phosphorescent region) is higher than that of the third wavelength conversion region 1303 (e.g., the red phosphorescent region). When the excitation light beam L1 with higher energy is, for example, a blue excitation light incident on the first wavelength conversion region 1301, the local temperature of the first wavelength conversion region 1301 is relatively higher, but due to the higher heat resistance of the first wavelength conversion region 1301, the first wavelength conversion region 1301 may still maintain high conversion efficiency at high temperature, and convert the excitation light beam L1 into, for example, a green converted light beam L5.

Figure 8A:
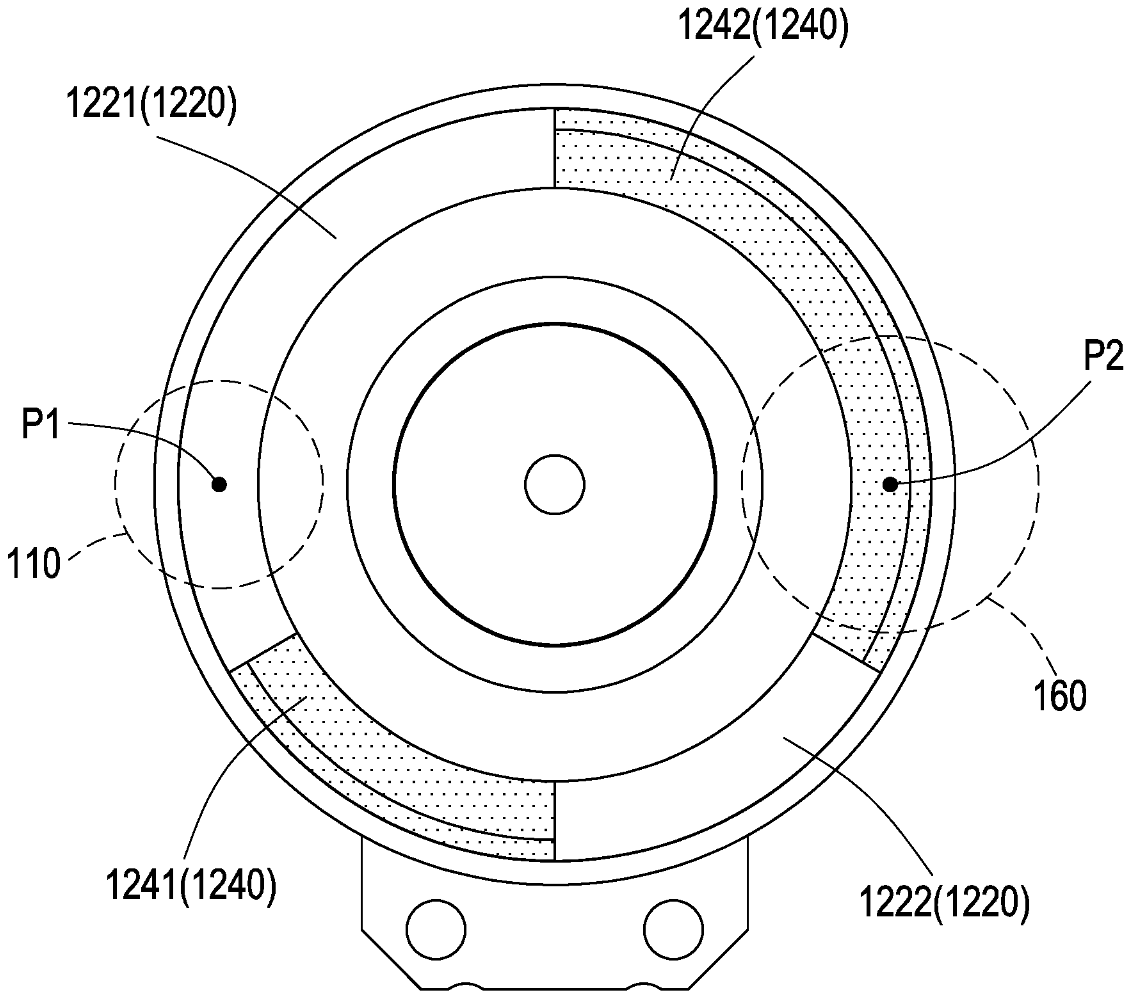
FIG. 8A is a top view of FIG. 6A at a second time sequence.
Figure 8B:
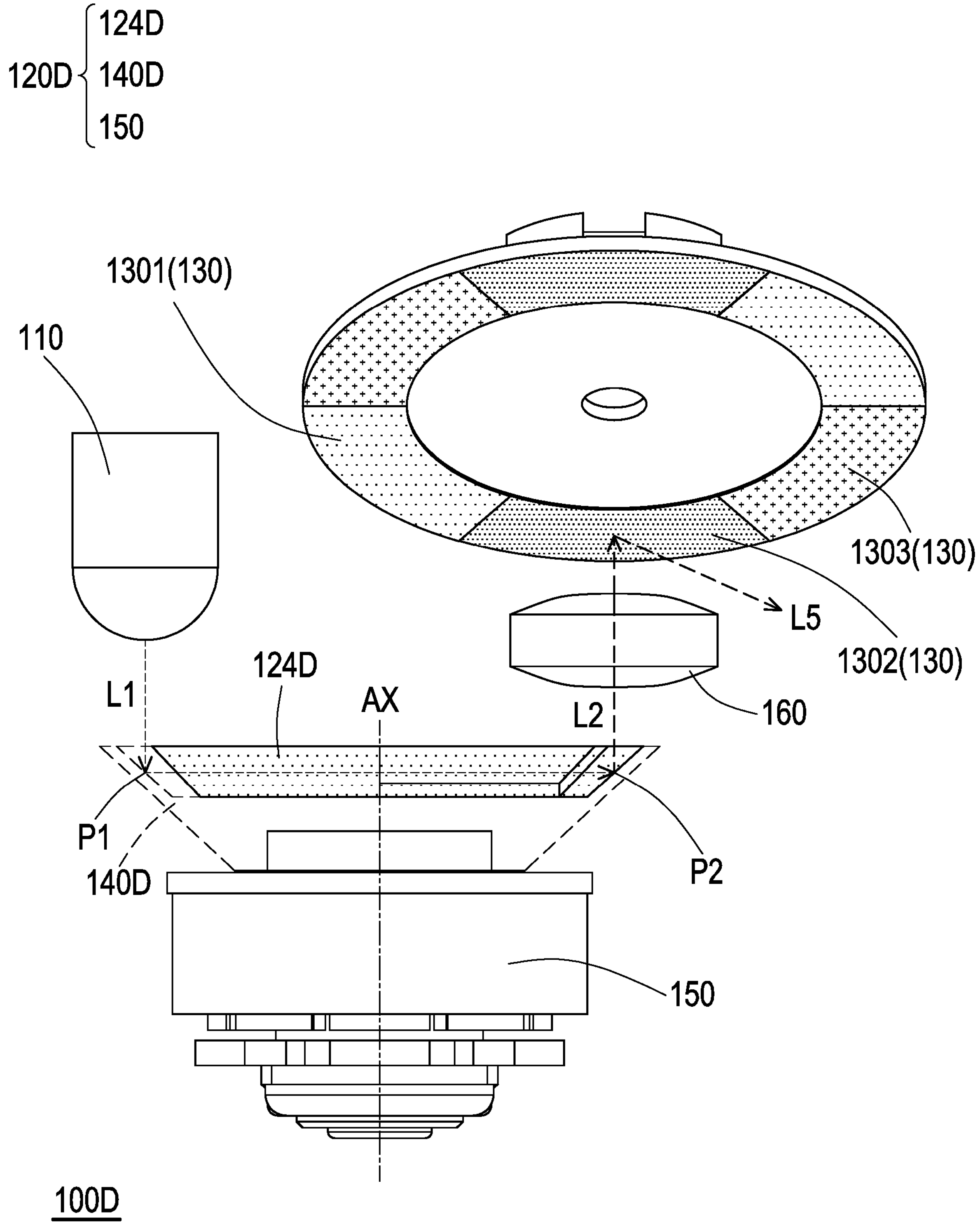
FIG. 8B is a side view of FIG. 6A at a second time sequence.

FIG. 8A is a top view of FIG. 6A at a second time sequence. FIG. 8B is a side view of FIG. 6A at a second time sequence. In order to clearly present the reflective diffusion device, the wavelength conversion device in FIG. 8A is hidden, and the light source module and the lens are shown in dashed lines. In order to clearly present the diffusion device, the reflecting member of FIG. 8B is shown in dashed lines. Referring to FIG. 8A and FIG. 8B, at a second time sequence T2, one of the first position P1 and the second position P2 is in the reflection section 1220, and the other is in the diffusion section 1240. For example, the first position P1 is located in the first reflection section 1221, and the second position P2 is located in the second diffusion section 1242. In this way, the excitation light beam L1 (FIG. 8B) is not diffused when incident on and exiting from the first position P1, but is diffused twice when incident on and exiting from the second position P2. Therefore, the energy of the diffused light beam L2 (FIG. 8B) exiting from the second position P2 at the second time sequence T2 is lower than the energy of the excitation light beam L1 exiting from the second position P2 at the first time sequence T1.

On the other hand, at the second time sequence T2, the second wavelength conversion region 1302 (FIG. 8B) is located on the transmission path of the diffused light beam L2 from the second position P2, so that the diffused light beam L2 is incident on the second wavelength conversion region 1302. When the diffused light beam L2 with lower energy is incident on the second wavelength conversion region 1302, the local temperature of the second wavelength conversion region 1302 is lower than the local temperature of the first wavelength conversion region 1301 in the first time sequence T1, thus it is adapted for the second wavelength conversion region 1302 with weaker heat resistance than the first wavelength conversion region 1301. Therefore, the second wavelength conversion region 1302 may maintain a good conversion efficiency and convert the diffused light beam L2 into, for example, a yellow converted light beam L5.

Figure 9A:
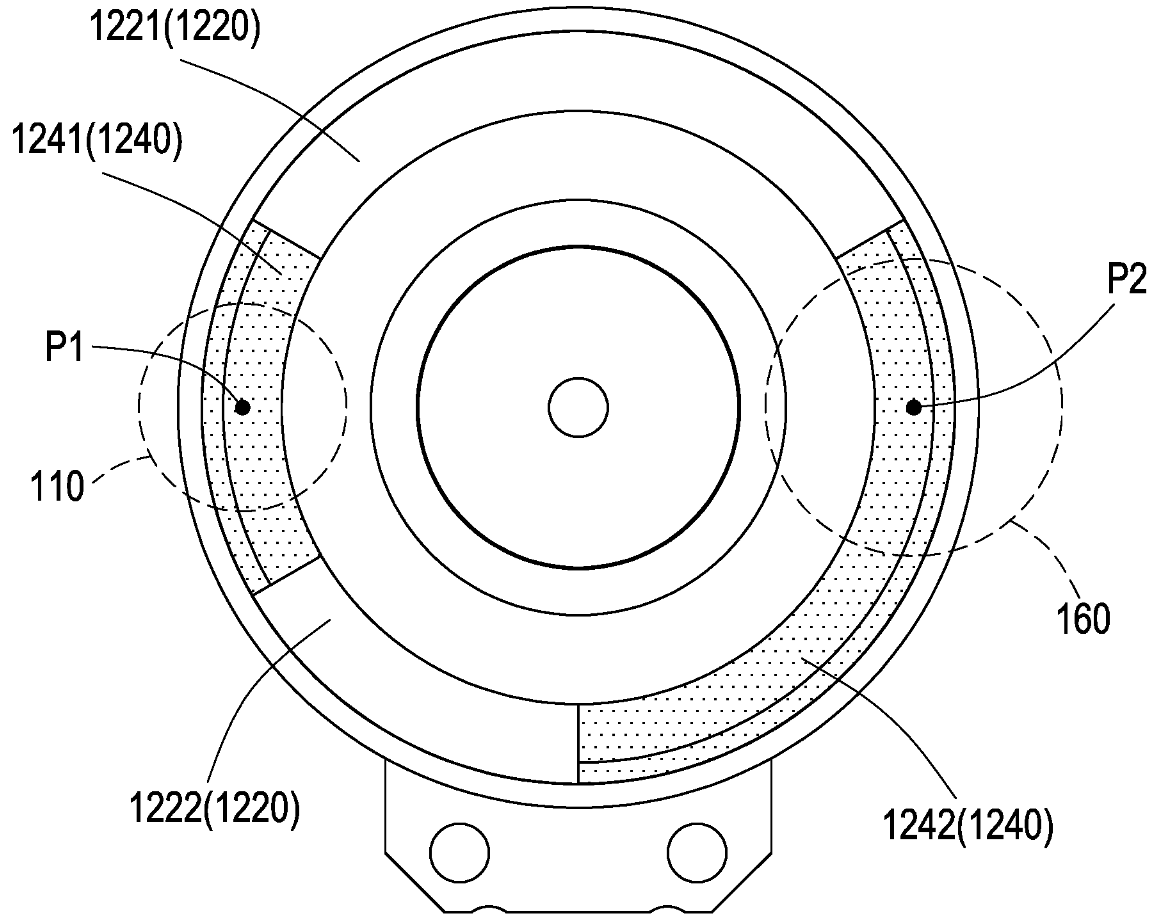
FIG. 9A is a top view of FIG. 6A at a third time sequence.
Figure 9B:
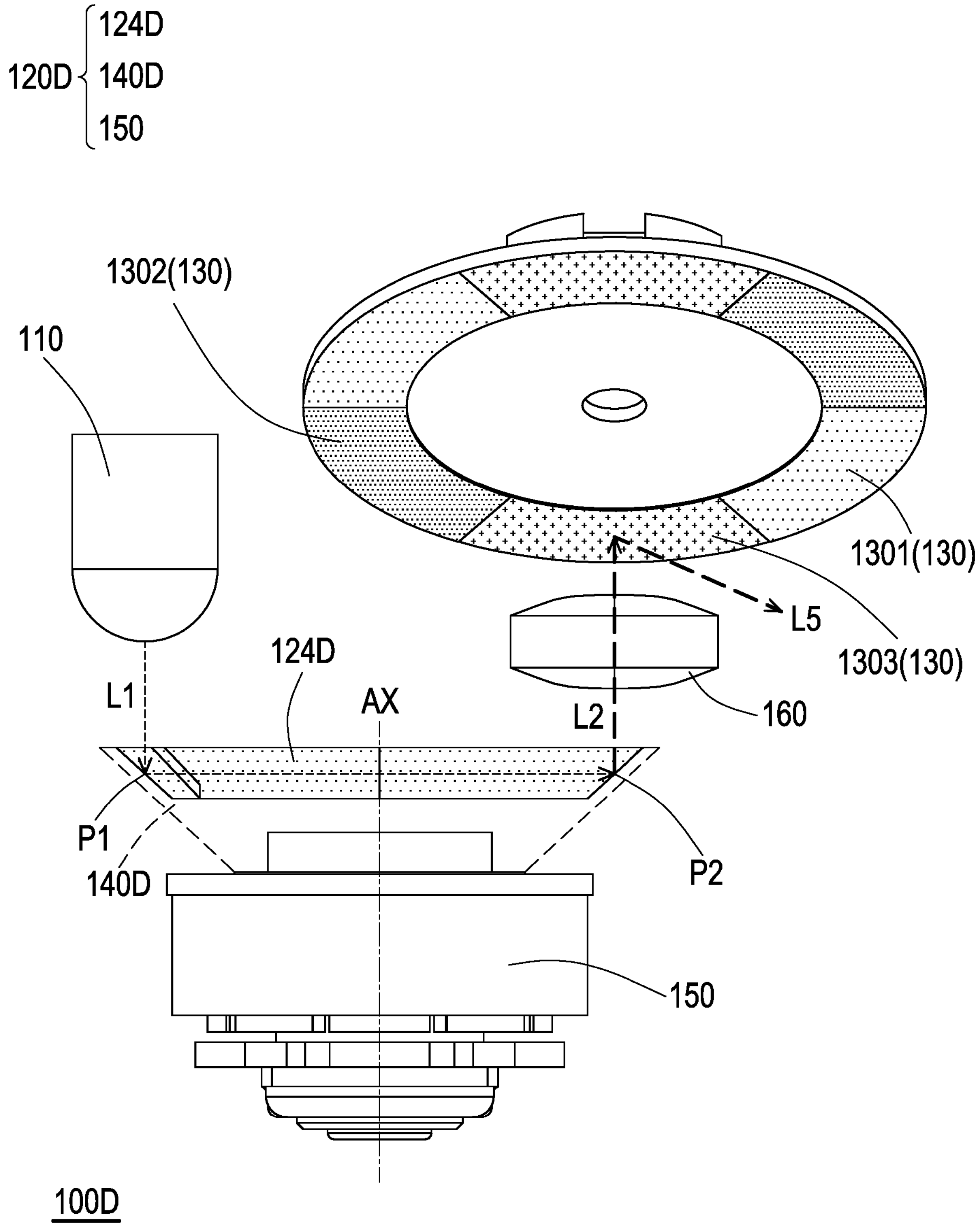
FIG. 9B is a side view of FIG. 6A at a third time sequence.

FIG. 9A is a top view of FIG. 6A at a third time sequence. FIG. 9B is a side view of FIG. 6A at a third time sequence. In order to clearly present the reflective diffusion device, the wavelength conversion device of FIG. 9A is hidden, and the light source module and the lens are shown in dashed lines. In order to clearly present the diffusion device, the reflecting member of FIG. 9B is shown in dashed lines. Referring to FIG. 9A and FIG. 9B, at a third time sequence T3, both the first position P1 and the second position P2 are in the diffusion section 1240. For example, the first position P1 is located in the first diffusion section 1241, and the second position P2 is located in the second diffusion section 1242. In this way, the excitation light beam L1 (FIG. 9B) is diffused twice when incident on and exiting the first position P1 and forms a diffused light beam L2, and also diffused twice when incident on and exiting the second position P2. Therefore, the diffused light beam L2 exiting from the second position P2 at the third time sequence T3 undergoes four diffusion in total, and its energy is lower than that of the diffused light beam L2 at the second time sequence T2.

On the other hand, at the third time sequence T3, the third wavelength conversion region 1303 (FIG. 9B) is located on the transmission path of the diffused light beam L2 from the second position P2, so that the diffused light beam L2 is incident on the third wavelength conversion region 1303. When the diffused light beam L2 with lower energy is incident on the third wavelength conversion region 1303, the local temperature of the third wavelength conversion region 1303 is lower than the local temperature of the second wavelength conversion region 1302 in the second time sequence T2, thus it is adapted for the third wavelength conversion region 1303 with weaker heat resistance than the second wavelength conversion region 1302. Therefore, the third wavelength conversion region 1303 may maintain a good conversion efficiency and convert the diffused light beam L2 into, for example, a red converted light beam L5.

After the third time sequence T3 ends, the reflective diffusion device 120D and the wavelength conversion device 130 return to the first time sequence T1, and so on. According to the actual test, the conversion efficiency of the wavelength conversion device 130 is at least 5% higher than that of the conventional wavelength conversion device, indicating that the different diffused light beams L2 or excitation light beams L1 exiting from the reflective diffusion device 120D at different time sequences, matching with different wavelength conversion regions, greatly improve the conversion efficiency of the wavelength conversion device 130. In addition, the wavelength conversion device 130 may be a transmissive wavelength conversion device or a reflective wavelength conversion device. The wavelength conversion device 130 in this embodiment is a reflective wavelength conversion device, and the converted light beam L5 reflected from the wavelength conversion device 130 serve as the lighting beam L3 provided by the lighting module (as shown in FIG. 1).

In another embodiment, a non-wavelength conversion region (not shown) may also be disposed on the wavelength conversion device, and the non-wavelength conversion region and the wavelength conversion region are alternately located on the transmission path of the diffused light beam or the excitation light beam. The blue diffused light beam or excitation light beam exiting from the reflective diffusion device may be reflected or transmitted through the non-wavelength conversion region to continue to serve as the lighting beam provided by the lighting module.

Figure 10A:
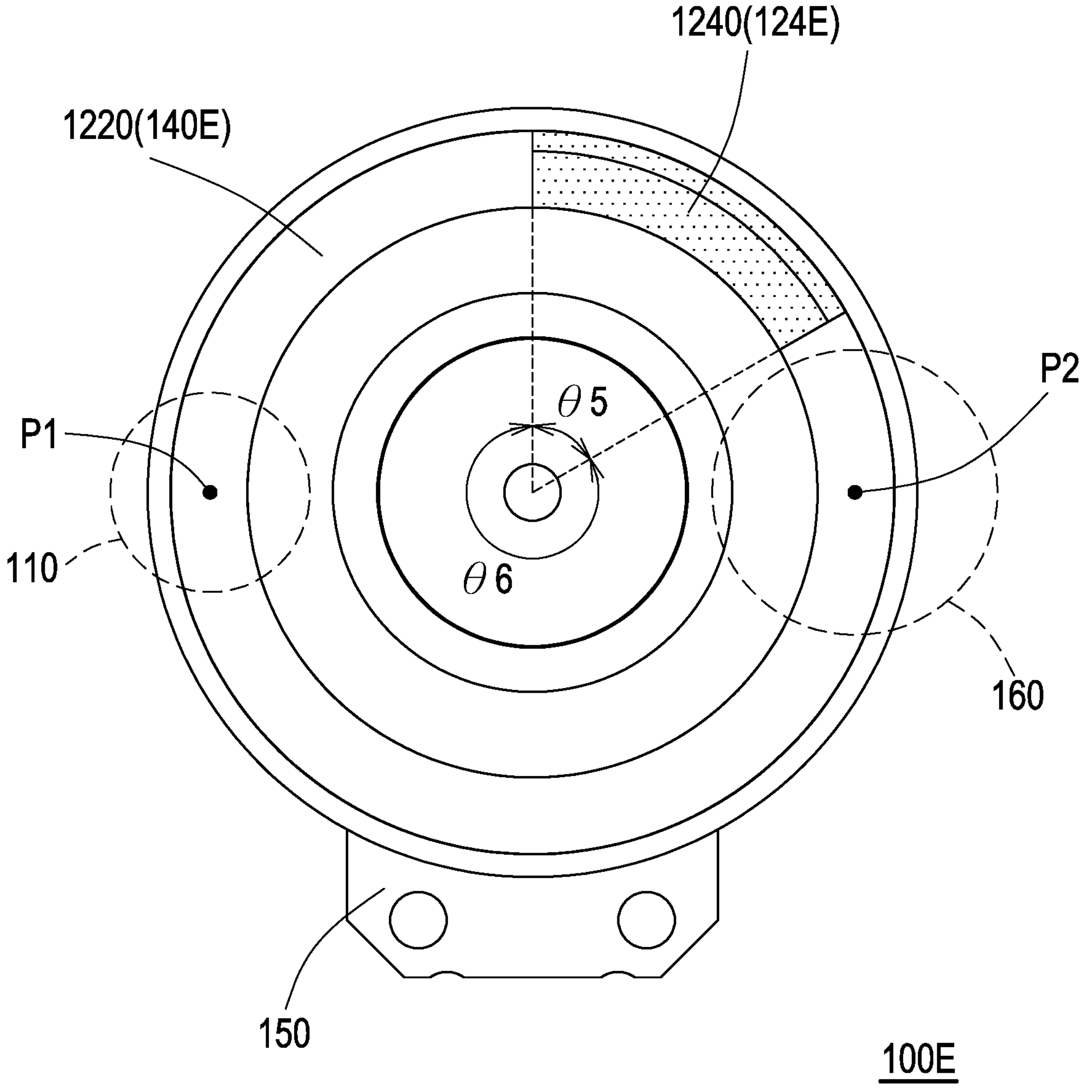
FIG. 10A is a top view of a portion of a lighting module at a first time sequence according to another embodiment of the invention.
Figure 10B:
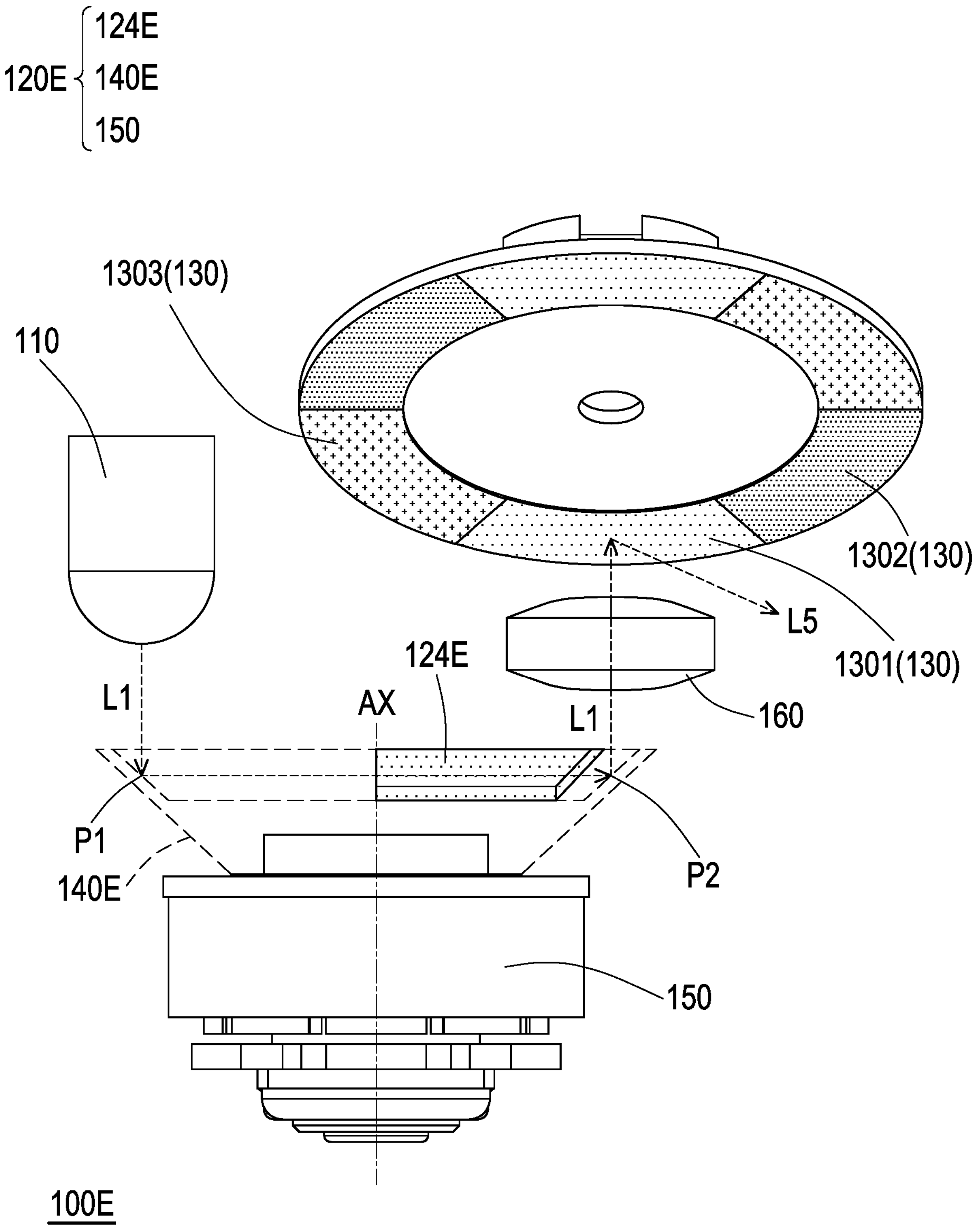
FIG. 10B is a side view of FIG. 10A at a first time sequence.

FIG. 10A is a top view of a portion of a lighting module at first time sequence according to another embodiment of the invention. FIG. 10B is a side view of FIG. 10A at a first time sequence. In order to clearly present the reflective diffusion device, the wavelength conversion device of FIG. 10A is hidden, and the light source module and the lens are shown in dashed lines. In order to clearly present the diffusion device, the reflecting member of FIG. 10B is shown in dashed lines. Referring to FIG. 10A and FIG. 10B, the lighting module 100E of this embodiment is similar to the aforementioned lighting module 100D, the difference between the two is that the number of the diffusion sections 1240 of the reflective diffusion device 120E of the lighting module 100E is one, and the number of the reflection sections 1220 is also one. The fifth angle θ5 distributed by the diffusion section 1240 is, for example, 60 degrees, and the sixth angle θ6 distributed by the reflection section 1220 is, for example, 300 degrees. Of course, the degrees of the fifth angle θ5 and the sixth angle θ6 are not limited thereto.

When the driving element 150 drives the diffusing member 124E and the reflecting member 140E to rotate around the central axis AX, at the first time sequence T1, the first position P1 and the second position P2 are both in the reflection section 1220. That is to say, when the excitation light beam L1 (FIG. 10B) is incident to the first position P1 and transmitted to the second position P2, and then exiting from the second position P2, the excitation light beam L1 does not pass through the diffusing member 124E at all, and has a relatively high energy.

On the other hand, at the first time sequence T1, the first wavelength conversion region 1301 (FIG. 10B) is located on the transmission path of the excitation light beam L1 from the second position P2, so that the excitation light beam L1 is incident to the first wavelength conversion region 1301. When the excitation light beam L1 with higher energy is, for example, a blue excitation light incident on the first wavelength conversion region 1301 (e.g., the green phosphorescent region), the local temperature of the first wavelength conversion region 1301 is relatively higher. However, due to the higherheat resistance of the first wavelength conversion region 1301, high conversion efficiency may still be maintained at high temperature, and the excitation light beam L1 may be converted into, for example, a green converted light beam L5.

Figure 11A:
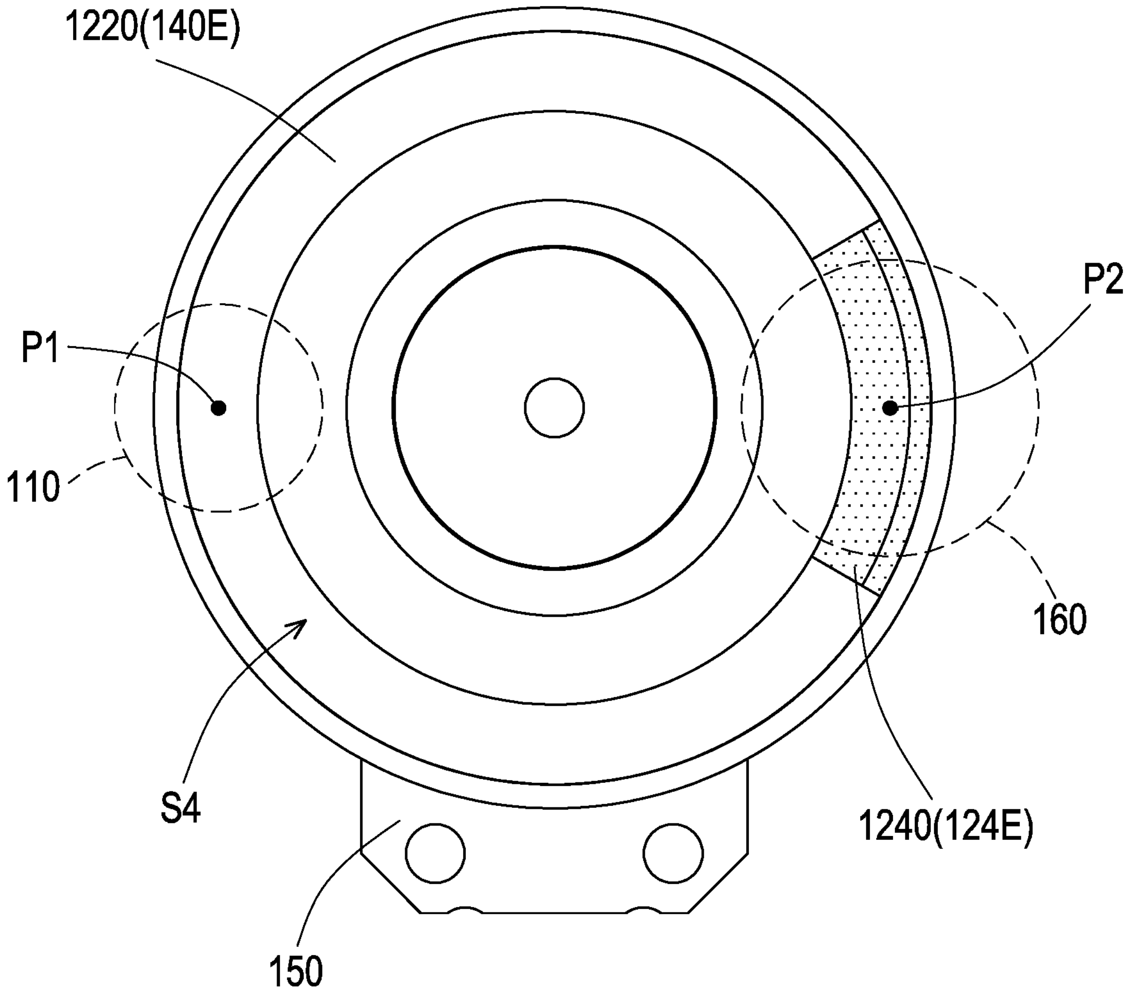
FIG. 11A is a top view of FIG. 10A at a second time sequence.
Figure 11B:
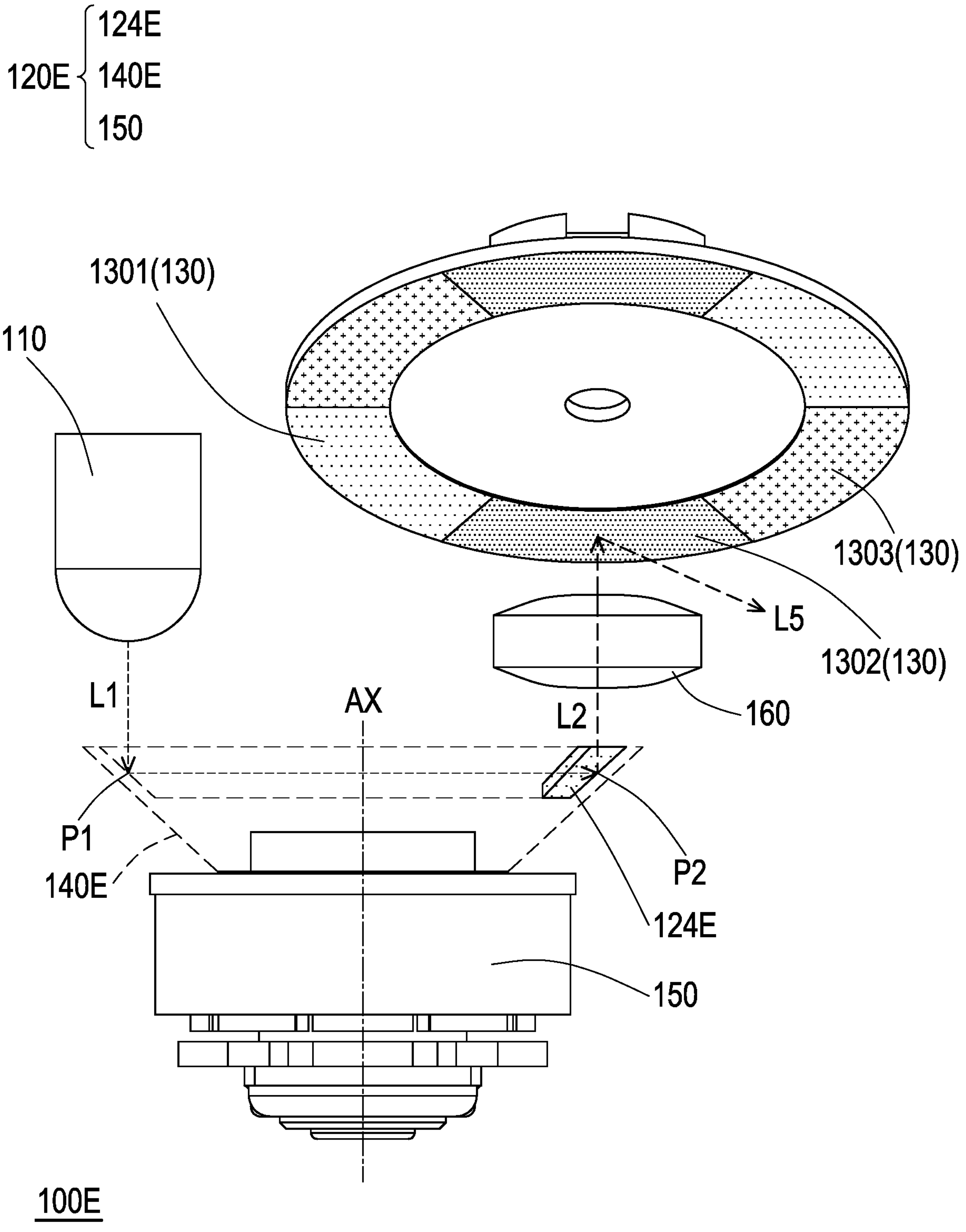
FIG. 11B is a side view of FIG. 10A at a second time sequence.

FIG. 11A is a top view of FIG. 10A at a second time sequence. FIG. 11B is a side view of FIG. 10A at a second time sequence. In order to clearly present the reflective diffusion device, the wavelength conversion device of FIG. 11A is hidden, and the light source module and the lens are shown in dashed lines. In order to clearly present the diffusion device, the reflecting member of FIG. 11B is shown in dashed lines. Referring to FIG. 11A and FIG. 11B, at a second time sequence T2, one of the first position P1 and the second position P2 is in the reflection section 1220, and the other is in the diffusion section 1240. For example, the first position P1 is located in the reflection section 1220, and the second position P2 is located in the diffusion section 1240. In this way, the excitation light beam L1 (FIG. 11B) is not diffused when incident on and exiting from the first position P1, but is diffused twice when incident on and exiting from the second position P2 to form the diffused light beam L2. Therefore, the energy of the diffused light beam L2

(FIG. 11B) exiting from the second position P2 at the second time sequence T2 is lower than the energy of the excitation light beam L1 exiting from the second position P2 at the first time sequence T1.

On the other hand, at the second time sequence T2, the second wavelength conversion region 1302 (FIG. 11B) is located on the transmission path of the diffused light beam L2 from the second position P2, so that the diffused light beam L2 is incident on the second wavelength conversion region 1302. When the diffused light beam L2 with lower energy is incident on the second wavelength conversion region 1302, the local temperature of the second wavelength conversion region 1302 is lower than the local temperature of the first wavelength conversion region 1301 in the first time sequence T1, thus it is adapted for the second wavelength conversion region 1302, such as a yellow phosphorescent region, with weaker heat resistance than the first wavelength conversion region 1301. Therefore, the second wavelength conversion region 1302 may maintain a good conversion efficiency and convert the diffused light beam L2 into, for example, a yellow converted light beam L5.

Figure 12A:
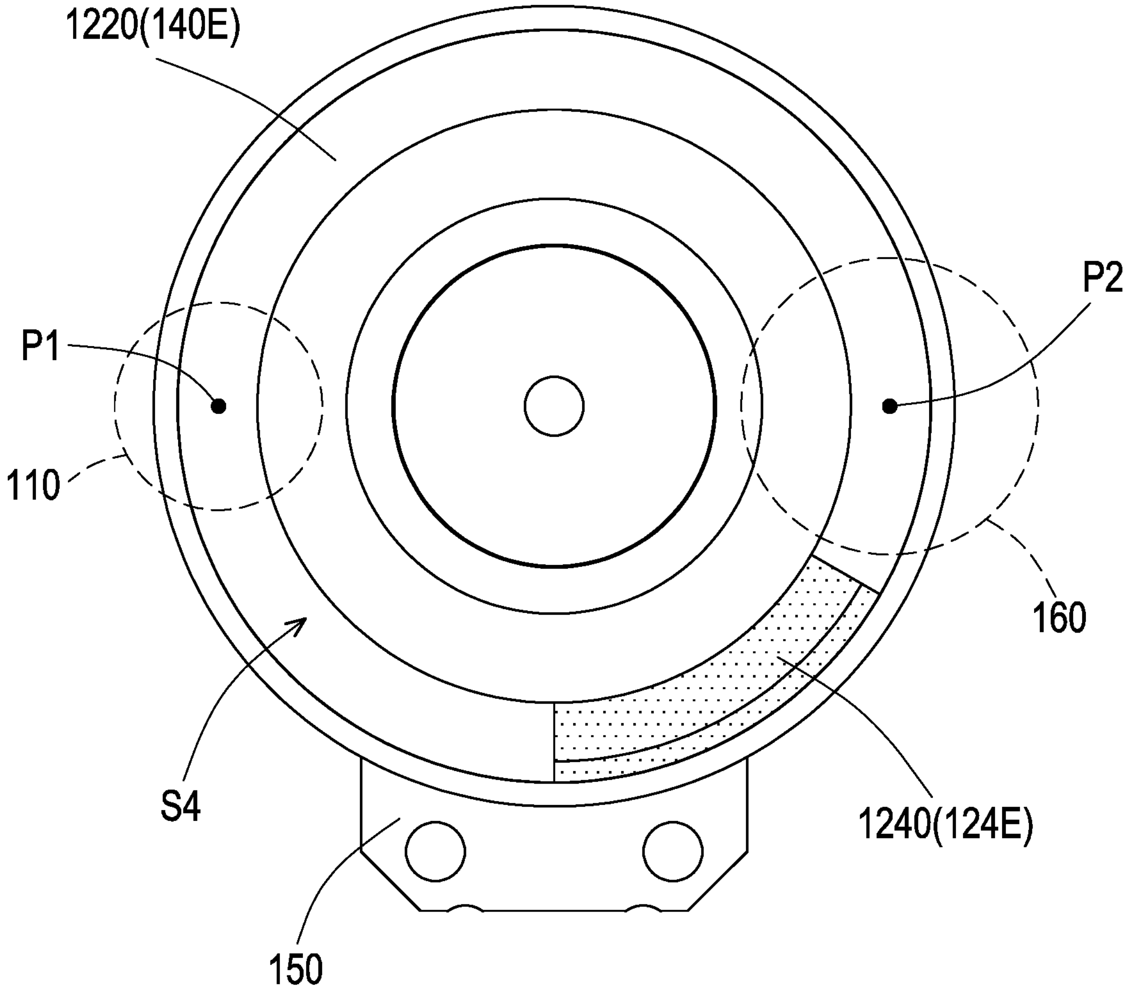
FIG. 12A is a top view of FIG. 10A at a third time sequence.
Figure 12B:
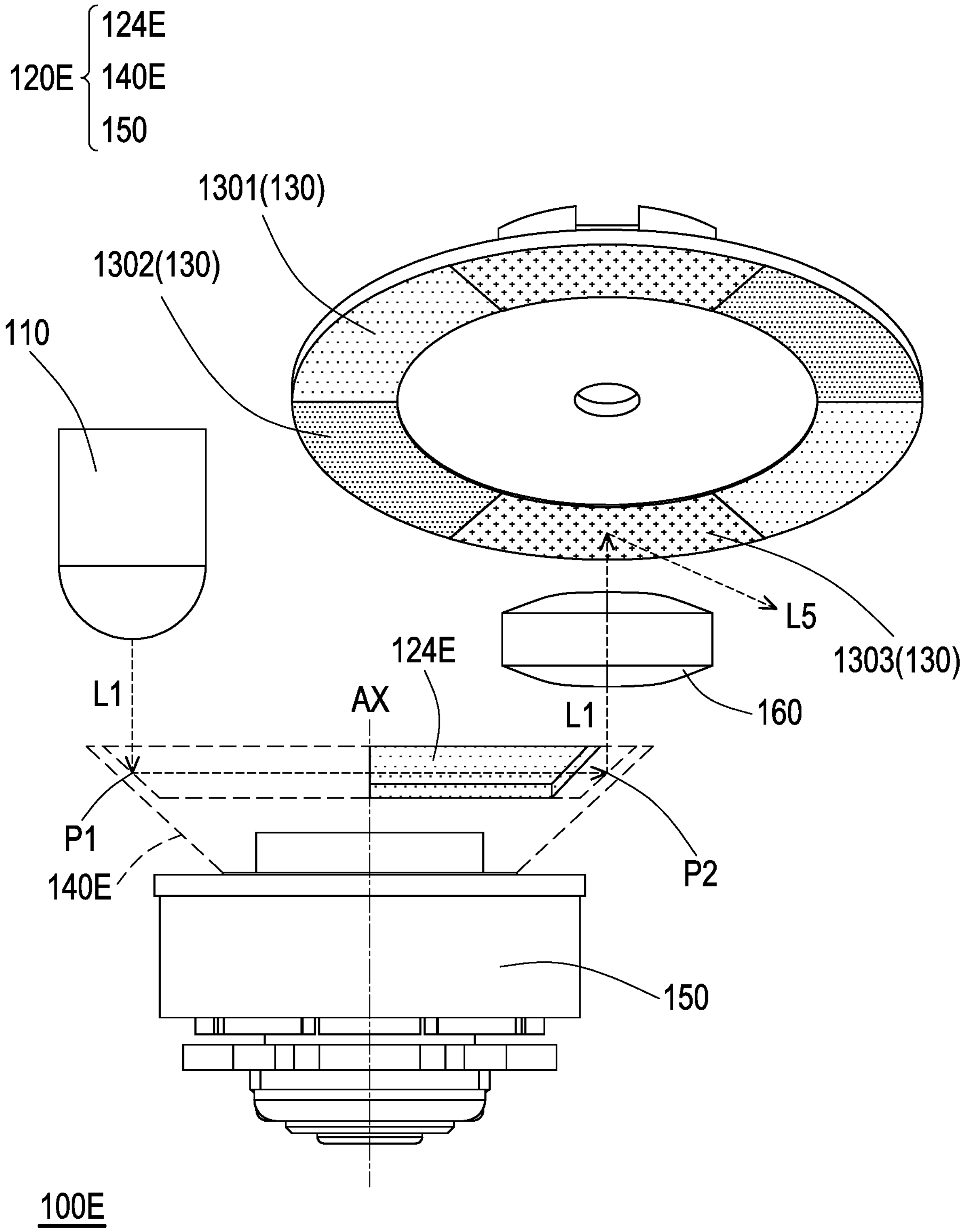
FIG. 12B is a side view of FIG. 10A at a third time sequence.

FIG. 12A is a top view of FIG. 10A at a third time sequence. FIG. 12B is a side view of FIG. 10A at a third time sequence. In order to clearly present the reflective diffusion device, the wavelength conversion device of FIG. 11A is hidden, and the light source module and the lens are shown in dashed lines. In order to clearly present the diffusion device, the reflecting member of FIG. 12B is shown in dashed lines. Referring to FIG. 12A and FIG. 12B, at a third time sequence T3, the first position P1 and the second position P2 return to the reflection section 1220. In this way, the excitation light beam L1 (FIG. 12B) does not pass through the diffusing member 124E at all during the process of being transmitted from the incident first position P1 to the second position P2 and then exiting from the second position P2, so the excitation light beam L1 is not diffused and maintains a high energy.

On the other hand, at the third time sequence T3, the third wavelength conversion region 1303 (FIG. 12B) is located on the transmission path of the excitation light beam L1 from the second position P2, so that the excitation light beam L1 is incident on the third wavelength conversion region 1303. When the excitation light beam L1 is incident on the third wavelength conversion region 1303, the third wavelength conversion region is, for example, a red phosphorescent region, which may convert the excitation light beam L1 into, for example, a red converted light beam L5.

After the third time sequence T3 ends, the reflective diffusion device 120E and the wavelength conversion device 130 return to the position of the first time sequence T1, and so on. By adjusting the number and the distribution method of the diffusing member 124E and the reflecting member 140E, the excitation light beam L1 or the diffused light beam L2 may be generated at different time sequences, and may be matched with different wavelength conversion regions, thereby improving the conversion efficiency of the wavelength conversion device 130. The converted light beam L5 exiting from the wavelength conversion device 130 serve as the lighting beam L3 provided by the lighting module (as shown in FIG. 1).

In another embodiment, a non-wavelength conversion region (not shown) may also be disposed on the wavelength conversion device, and the non-wavelength conversion region and the wavelength conversion region are alternately located on the transmission path of the diffused light beam or the excitation light beam. The blue diffused light beam or excitation light beam exiting from the reflective diffusion device may be reflected or transmitted through the non-wavelength conversion region to continue to serve as the lighting beam provided by the lighting module.

To sum up, the reflective diffusion device of the invention includes a reflecting member and a diffusing member, which are adapted for reflecting and diffusing the excitation light beam emitted by the light source module. Through the matching of the reflecting member and the diffusion device, the incident excitation light beam and the exiting diffused light beam are located on the same side of the reflective diffusion device, so that the beam path is not required to transmit through the reflective diffusion device to achieve the effect of eliminating the speckle, which facilitates space utilization and improves the flexibility of beam path design. In addition, the excitation light beam passes through the diffusing member at least twice, which may achieve better beam diffusing effect.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A reflective diffusion device, adapted for reflecting and diffusing an excitation light beam emitted from a light source module, comprising a reflecting member, a diffusing member, and a driving element; wherein, the reflecting member has a central axis and comprises a reflective surface facing the light source module, wherein an included angle greater than 0 degrees and less than 90 degrees is between the reflective surface and the central axis;

the diffusing member is disposed on at least a portion of the reflective surface of the reflecting member, wherein the excitation light beam is incident on a first position of the reflective diffusion device in an incident direction parallel to the central axis, is reflected by the reflective surface of the reflecting member, is transmitted and incident on a second position of the reflective diffusion device, and is then reflected by the reflective surface to maintain the excitation light beam or form a diffused light beam, the excitation light beam or the diffused light beam exits from the reflective diffusion device in an exit direction parallel to the central axis, and the first position and the second position are symmetrical to the central axis; and the driving element has a rotating shaft, the reflecting member is disposed on the rotating shaft of the driving element, the rotating shaft is collinear with the central axis, and the driving element is configured to drive the diffusing member and the reflecting member to rotate around the central axis, wherein the reflective surface is ring-shaped around the central axis, the diffusing member is disposed on the portion of the reflective surface of the reflecting member to form at least one diffusion section, and an exposed portion of the reflective surface that is not covered by the diffusing member forms at least one reflection section, and a sum of an angle distributed by the at least one diffusion section with the central axis as a center of a circle and an angle distributed by the at least one reflection section with the center axis as the center of the circle is 360 degrees.

2. The reflective diffusion device according to claim 1, wherein the first position is in one of the diffusing member or the reflecting member, and the second position is in one of the diffusing member or the reflecting member.

3. The reflective diffusion device according to claim 1, wherein the reflective surface comprises at least portion of a bowl-shaped curved surface, at least portion of a conical surface, or two inclined surfaces facing each other.

4. The reflective diffusion device according to claim 1, wherein a number of the at least one diffusion section is one, the angle distributed by the diffusion section is 60 degrees, a number of the at least one reflection section is one, and the angle distributed by the reflection section is 300 degrees.

5. The reflective diffusion device according to claim 1, wherein the driving element drives the reflecting member to rotate, at a first time sequence, the first position and the second position are both in the at least one reflection section, and at a second time sequence, one of the first position and the second position is in the at least one reflection section, and another one of the first position and the second position is in the at least one diffusion section.

6. The reflective diffusion device according to claim 1, wherein the at least one diffusion section comprises a first diffusion section and a second diffusion section that are separated from each other, the at least one reflection section comprises a first reflection section and a second reflection section, the first diffusion section is located between the first reflection section and the second reflection section, and the first reflection section is located between the first diffusion section and the second diffusion section.

7. The reflective diffusion device according to claim 6, wherein, an angle distributed by the first diffusion section with the central axis as the center of the circle is the same as or different from an angle distributed by the second diffusion section with the central axis as the center of the circle, or/and, an angle distributed by the first reflection section with the central axis as the center of the circle is the same as or different from an angle distributed by the second reflection section with the central axis as the center of the circle.

8. The reflective diffusion device according to claim 7, wherein the angle distributed by the first diffusion section is 60 degrees, the angle distributed by the second diffusion section is 120 degrees, the angle distributed by the first reflection section is 120 degrees, and the angle distributed by the second reflection section is 60 degrees.

9. The reflective diffusion device according to claim 6, wherein the driving element drives the diffusing member and the reflecting member to rotate, at a first time sequence, the first position is in the first reflection section, and the second position is in the second reflection section, at a second time sequence, the first position is in the first reflection section, the second position is in the second diffusion section, and at a third time sequence, the first position is in the first diffusion section, and the second position is in the second diffusion section.

10. A projection device, comprising: a lighting module, a light valve, and a projection lens, wherein the lighting module is configured to provide a lighting beam, the light valve is disposed on a path of the lighting beam to convert the lighting beam into an image beam, the projection lens is disposed on a path of the image beam and is used to project the image beam out of the projection device; wherein the lighting module comprises:

a light source module, configured to emit an excitation light beam;

a reflective diffusion device, comprising a reflecting member, a diffusing member, and a driving element; wherein the reflecting member has a central axis and comprises a reflective surface facing the light source module, wherein an included angle greater than 0 degrees and less than 90 degrees is between the reflective surface and the central axis;

the diffusing member is disposed on at least a portion of the reflective surface of the reflecting member, wherein the excitation light beam is incident on a first position of the reflective diffusion device in an incident direction parallel to the central axis, is reflected by the reflective surface of the reflecting member, is transmitted and incident on a second position of the reflective diffusion device, and is then reflected by the reflective surface to maintain the excitation light beam or form a diffused light beam, the excitation light beam or the diffused light beam exits from the reflective diffusion device in an exit direction parallel to the central axis, and the first position and the second position are symmetrical to the central axis; and the driving element has a rotating shaft, the reflecting member is disposed on the rotating shaft of the driving element, the rotating shaft is collinear with the central axis, and the driving element is configured to drive the diffusing member and the reflecting member to rotate around the central axis; and a wavelength conversion device, disposed on a path of the excitation light beam or the diffused light beam from the reflective diffusion device to convert the excitation light beam or the diffused light beam into a converted light beam, wherein the converted light beam transmitted out of the lighting module serves as the lighting beam provided by the lighting module, wherein the reflective surface is ring-shaped around the central axis, the diffusing member is disposed on the portion of the reflective surface of the reflecting member to form at least one diffusion section, and an exposed portion of the reflective surface that is not covered by the diffusing member forms at least one reflection section, and a sum of an angle distributed by the at least one diffusion section with the central axis as a center of a circle and an angle distributed by the at least one reflection section with the center axis as the center of the circle is 360 degrees.

11. The projection device according to claim 10, wherein the first position is in one of the diffusing member and the reflecting member, and the second position is in one of the diffusing member and the reflecting member.

12. The projection device according to claim 10, wherein the reflective surface comprises at least portion of a bowl-shaped curved surface, at least portion of a conical surface, or two inclined surfaces facing each other.

13. The projection device according to claim 5, wherein a number of the at least one diffusion section is one, the angle distributed by the diffusion section is 60 degrees, a number of the at least one reflection section is one, and the angle distributed by the reflection section is 300 degrees.

14. The projection device according to claim 5, wherein the driving element drives the diffusing member and the reflecting member to rotate, at a first time sequence, the first position and the second position are both in the at least one reflection section, and at a second time sequence, one of the first position and the second position is in the at least one reflection section, and another one of the first position and the second position is in the at least one diffusion section.

15. The projection device according to claim 14, wherein the wavelength conversion device comprises a first wavelength conversion region and a second wavelength conversion region, and the first wavelength conversion region and the second wavelength conversion region are adapted for alternately being located on a transmission path of the excitation light beam or the diffused light beam, at the first time sequence, the first wavelength conversion region is located on the transmission path of the excitation light beam from the second position, and at the second time sequence, the second wavelength conversion region is located on the transmission path of the diffused light beam from the second position.

16. The projection device according to claim 5, wherein the at least one diffusion section comprises a first diffusion section and a second diffusion section that are separated from each other, the at least one reflection section comprises a first reflection section and a second reflection section, the first diffusion section is located between the first reflection section and the second reflection section, and the first reflection section is located between the first diffusion section and the second diffusion section.

17. The projection device according to claim 16, wherein, an angle distributed by the first diffusion section with the central axis as the center of the circle is the same as or different from an angle distributed by the second diffusion section with the central axis as the center of the circle, or/and, an angle distributed by the first reflection section with the central axis as the center of the circle is the same as or different from an angle distributed by the second reflection section with the central axis as the center of the circle.

18. The projection device according to claim 17, wherein the angle distributed by the first diffusion section is 60 degrees, the angle distributed by the second diffusion section is 120 degrees, the angle distributed by the first reflection section is 120 degrees, and the angle distributed by the second reflection section is 60 degrees.

19. The projection device according to claim 16, wherein the driving element drives the reflecting member to rotate, at a first time sequence, the first position is in the first reflection section, and the second position is in the second reflection section, at a second time sequence, the first position is in the first reflection section, the second position is in the second diffusion section, and at a third time sequence, the first position is in the first diffusion section, and the second position is in the second diffusion section.

20. The projection device according to claim 19, wherein the wavelength conversion device comprises a first wavelength conversion region, a second wavelength conversion region and a third wavelength conversion region, and the first wavelength conversion region, the second wavelength conversion region and the third wavelength conversion region are adapted for alternately being located on a transmission path of the excitation light beam or the diffused light beam, at the first time sequence, the first wavelength conversion region is located on the transmission path of the excitation light beam from the second position, at the second time sequence, the second wavelength conversion region is located on the transmission path of the diffused light beam from the second position, and at the third time sequence, the third wavelength conversion region is located on the transmission path of the diffused light beam from the second position.

* * * * *